(12) United States Patent
Srinivasan et al.

(10) Patent No.: US 9,990,402 B2
(45) Date of Patent: *Jun. 5, 2018

(54) MANAGING CONTINUOUS QUERIES IN THE PRESENCE OF SUBQUERIES

(71) Applicant: Oracle International Corporation, Redwood Shores, CA (US)

(72) Inventors: Anand Srinivasan, Bangalore (IN); Vikram Shukla, Fremont, CA (US); Unmesh Anil Deshmukh, Nagpur (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 13/830,502

(22) Filed: Mar. 14, 2013

(65) Prior Publication Data

US 2014/0095473 A1 Apr. 3, 2014

Related U.S. Application Data

(60) Provisional application No. 61/707,641, filed on Sep. 28, 2012.

(51) Int. Cl.
*G06F 17/30* (2006.01)

(52) U.S. Cl.
CPC .. *G06F 17/30516* (2013.01); *G06F 17/30389* (2013.01); *G06F 17/30424* (2013.01);
(Continued)

(58) Field of Classification Search
CPC ................................................ G06F 17/30548
See application file for complete search history.

(56) References Cited

U.S. PATENT DOCUMENTS

| 4,996,687 A | 2/1991 | Hess et al. |
| 5,051,947 A | 9/1991 | Messenger et al. |

(Continued)

FOREIGN PATENT DOCUMENTS

| CN | 101866353 | 10/2010 |
| CN | 102135984 | 7/2011 |

(Continued)

OTHER PUBLICATIONS

Arasu et al., "The CQL continuous query language: semantic foundations and query execution" Jul. 22, 2005, The VLDB Journal vol. 15 Issue 2, [retrieved on Nov. 13, 2014], retrieved from the internet <URL:http://dl.acm.org/citation.cfm?id=1146463>.*

(Continued)

*Primary Examiner* — Aleksandr Kerzhner
*Assistant Examiner* — Giuseppi Giuliani
(74) *Attorney, Agent, or Firm* — Kilpatrick Townsend & Stockton LLP

(57) ABSTRACT

Techniques for managing continuous queries that include subqueries are provided. In some examples, a continuous query that includes at least a subquery may be identified. Additionally, the subquery may be processed to obtain a first result or generate a logical subquery plan. Further, in some instances, the continuous query may then be processed based at least in part on the first result from the subquery or by merging a logical continuous query plan with the logical subquery plan. This may result in obtaining a second result via querying a data source with the continuous query that is based at least in part on the first result from the subquery and/or the merged plans.

14 Claims, 12 Drawing Sheets

(52) U.S. Cl.
CPC .. *G06F 17/30442* (2013.01); *G06F 17/30451* (2013.01); *G06F 17/30457* (2013.01); *G06F 17/30477* (2013.01); *G06F 17/30483* (2013.01); *G06F 17/30498* (2013.01); *G06F 17/30548* (2013.01); *G06F 17/30551* (2013.01); *G06F 17/30554* (2013.01); *G06F 17/30557* (2013.01); *G06F 17/30616* (2013.01); *G06F 17/30864* (2013.01); *G06F 17/30958* (2013.01)

(56) References Cited

U.S. PATENT DOCUMENTS

| | | |
|---|---|---|
| 5,339,392 A | 8/1994 | Risberg et al. |
| 5,495,600 A | 2/1996 | Terry et al. |
| 5,691,917 A | 11/1997 | Harrison |
| 5,706,494 A | 1/1998 | Cochrane et al. |
| 5,802,262 A | 9/1998 | Van De |
| 5,802,523 A | 9/1998 | Jasuja et al. |
| 5,822,750 A | 10/1998 | Jou et al. |
| 5,826,077 A | 10/1998 | Blakeley et al. |
| 5,850,544 A | 12/1998 | Parvathaneny et al. |
| 5,857,182 A | 1/1999 | DeMichiel et al. |
| 5,918,225 A | 6/1999 | White et al. |
| 5,920,716 A | 7/1999 | Johnson et al. |
| 5,937,195 A | 8/1999 | Ju et al. |
| 5,937,401 A | 8/1999 | Hillegas et al. |
| 6,006,235 A | 12/1999 | Macdonald et al. |
| 6,011,916 A | 1/2000 | Moore et al. |
| 6,041,344 A | 3/2000 | Bodamer et al. |
| 6,081,801 A | 6/2000 | Cochrane et al. |
| 6,092,065 A | 7/2000 | Floratos et al. |
| 6,108,666 A | 8/2000 | Floratos et al. |
| 6,112,198 A | 8/2000 | Lohman et al. |
| 6,128,610 A | 10/2000 | Srinivasan et al. |
| 6,158,045 A | 12/2000 | You |
| 6,212,673 B1 | 4/2001 | House et al. |
| 6,219,660 B1 | 4/2001 | Haderle et al. |
| 6,263,332 B1 | 7/2001 | Nasr et al. |
| 6,278,994 B1 | 8/2001 | Fuh et al. |
| 6,282,537 B1 | 8/2001 | Madnick et al. |
| 6,341,281 B1 | 1/2002 | MacNicol et al. |
| 6,353,821 B1 | 3/2002 | Gray et al. |
| 6,367,034 B1 | 4/2002 | Novik et al. |
| 6,370,537 B1 | 4/2002 | Gilbert et al. |
| 6,389,436 B1 | 5/2002 | Chakrabarti et al. |
| 6,397,262 B1 | 5/2002 | Hayden et al. |
| 6,418,448 B1 | 7/2002 | Sakar |
| 6,438,540 B2 | 8/2002 | Nasr et al. |
| 6,438,559 B1 | 8/2002 | White et al. |
| 6,439,783 B1 | 8/2002 | Antoshenkov |
| 6,449,620 B1 | 9/2002 | Draper et al. |
| 6,453,314 B1 | 9/2002 | Chan et al. |
| 6,507,834 B1 | 1/2003 | Kabra et al. |
| 6,523,102 B1 | 2/2003 | Dye et al. |
| 6,546,381 B1 | 4/2003 | Subramanian et al. |
| 6,615,203 B1 | 9/2003 | Lin et al. |
| 6,633,867 B1 | 10/2003 | Kraft et al. |
| 6,681,343 B1 | 1/2004 | Nakabo |
| 6,708,186 B1 | 3/2004 | Claborn et al. |
| 6,718,278 B1 | 4/2004 | Steggles |
| 6,748,386 B1 | 6/2004 | Li |
| 6,751,619 B1 | 6/2004 | Rowstron et al. |
| 6,766,330 B1 | 7/2004 | Chen et al. |
| 6,785,677 B1 | 8/2004 | Fritchman |
| 6,826,566 B2 | 11/2004 | Lewak et al. |
| 6,836,778 B2 | 12/2004 | Manikutty et al. |
| 6,850,925 B2 | 2/2005 | Chaudhuri et al. |
| 6,856,981 B2 | 2/2005 | Wyschogrod et al. |
| 6,904,019 B2 | 6/2005 | Heinen et al. |
| 6,985,904 B1 | 1/2006 | Kaluskar et al. |
| 6,986,019 B1 | 1/2006 | Bagashev et al. |
| 6,996,557 B1 | 2/2006 | Leung et al. |
| 7,020,696 B1 | 3/2006 | Perry et al. |
| 7,047,249 B1 | 5/2006 | Vincent |
| 7,051,034 B1 | 5/2006 | Ghosh et al. |
| 7,062,749 B2 | 6/2006 | Cyr et al. |
| 7,080,062 B1 | 7/2006 | Leung et al. |
| 7,093,023 B2 | 8/2006 | Lockwood et al. |
| 7,145,938 B2 | 12/2006 | Takeuchi et al. |
| 7,146,352 B2 | 12/2006 | Brundage et al. |
| 7,167,848 B2 | 1/2007 | Boukouvalas et al. |
| 7,203,927 B2 | 4/2007 | Al-Azzawe et al. |
| 7,224,185 B2 | 5/2007 | Campbell et al. |
| 7,225,188 B1 | 5/2007 | Gai et al. |
| 7,236,972 B2 | 6/2007 | Lewak et al. |
| 7,284,041 B2 | 10/2007 | Nakatani et al. |
| 7,305,391 B2 | 12/2007 | Wyschogrod et al. |
| 7,308,561 B2 | 12/2007 | Cornet et al. |
| 7,310,638 B1 | 12/2007 | Blair |
| 7,348,981 B1 | 3/2008 | Buck |
| 7,376,656 B2 | 5/2008 | Blakeley et al. |
| 7,383,253 B1 | 6/2008 | Tsimelzon et al. |
| 7,403,959 B2 | 7/2008 | Nishizawa et al. |
| 7,430,549 B2 | 9/2008 | Zane et al. |
| 7,440,461 B2 | 10/2008 | Sahita et al. |
| 7,451,143 B2 | 11/2008 | Sharangpani et al. |
| 7,475,058 B2 | 1/2009 | Kakivaya et al. |
| 7,483,976 B2 | 1/2009 | Ross |
| 7,516,121 B2 | 4/2009 | Liu et al. |
| 7,519,577 B2 | 4/2009 | Brundage et al. |
| 7,519,962 B2 | 4/2009 | Aman |
| 7,526,804 B2 | 4/2009 | Shelest et al. |
| 7,533,087 B2 | 5/2009 | Liu et al. |
| 7,546,284 B1 | 6/2009 | Martinez et al. |
| 7,552,365 B1 | 6/2009 | Marsh et al. |
| 7,567,953 B2 | 7/2009 | Kadayam et al. |
| 7,580,946 B2 | 8/2009 | Mansour et al. |
| 7,587,383 B2 | 9/2009 | Koo et al. |
| 7,603,674 B2 | 10/2009 | Cyr et al. |
| 7,613,848 B2 | 11/2009 | Amini et al. |
| 7,620,851 B1 | 11/2009 | Leavy et al. |
| 7,630,982 B2 | 12/2009 | Boyce et al. |
| 7,634,501 B2 | 12/2009 | Yabloko |
| 7,636,703 B2 | 12/2009 | Taylor et al. |
| 7,644,066 B2 | 1/2010 | Krishnaprasad et al. |
| 7,653,645 B1 | 1/2010 | Stokes |
| 7,672,964 B1 | 3/2010 | Yan et al. |
| 7,673,065 B2 | 3/2010 | Srinivasan et al. |
| 7,676,461 B2 | 3/2010 | Chkodrov et al. |
| 7,689,622 B2 | 3/2010 | Liu et al. |
| 7,693,891 B2 | 4/2010 | Stokes et al. |
| 7,702,629 B2 | 4/2010 | Cytron et al. |
| 7,702,639 B2 | 4/2010 | Stanley et al. |
| 7,711,782 B2 | 5/2010 | Kim et al. |
| 7,716,210 B2 | 5/2010 | Ozcan et al. |
| 7,739,265 B2 | 6/2010 | Jain et al. |
| 7,805,445 B2 | 9/2010 | Boyer et al. |
| 7,814,111 B2 | 10/2010 | Levin |
| 7,818,313 B1 * | 10/2010 | Tsimelzon et al. ........... 707/718 |
| 7,823,066 B1 | 10/2010 | Kuramura |
| 7,827,146 B1 | 11/2010 | De Landstheer et al. |
| 7,827,190 B2 | 11/2010 | Pandya |
| 7,844,829 B2 | 11/2010 | Meenakshisundaram |
| 7,870,124 B2 | 1/2011 | Liu et al. |
| 7,870,167 B2 | 1/2011 | Lu et al. |
| 7,877,381 B2 | 1/2011 | Ewen et al. |
| 7,895,187 B2 | 2/2011 | Bowman |
| 7,912,853 B2 | 3/2011 | Agrawal |
| 7,917,299 B2 | 3/2011 | Buhler et al. |
| 7,930,322 B2 | 4/2011 | Maclennan |
| 7,945,540 B2 | 5/2011 | Park et al. |
| 7,953,728 B2 | 5/2011 | Hu et al. |
| 7,954,109 B1 | 5/2011 | Durham et al. |
| 7,979,420 B2 | 7/2011 | Jain et al. |
| 7,984,043 B1 | 7/2011 | Waas |
| 7,987,204 B2 | 7/2011 | Stokes |
| 7,988,817 B2 | 8/2011 | Son |
| 7,991,766 B2 | 8/2011 | Srinivasan et al. |
| 7,996,388 B2 | 8/2011 | Jain et al. |
| 8,019,747 B2 | 9/2011 | Srinivasan et al. |
| 8,032,544 B2 | 10/2011 | Jing et al. |
| 8,046,747 B2 | 10/2011 | Cyr et al. |
| 8,073,826 B2 | 12/2011 | Srinivasan et al. |

(56) References Cited

U.S. PATENT DOCUMENTS

| | | |
|---|---|---|
| 8,099,400 B2 | 1/2012 | Haub et al. |
| 8,103,655 B2 | 1/2012 | Srinivasan et al. |
| 8,122,006 B2 | 2/2012 | De Castro et al. |
| 8,134,184 B2 | 3/2012 | Becker et al. |
| 8,145,686 B2 | 3/2012 | Raman et al. |
| 8,145,859 B2 | 3/2012 | Park et al. |
| 8,155,880 B2 | 4/2012 | Patel et al. |
| 8,190,738 B2 | 5/2012 | Ruehle |
| 8,195,648 B2 | 6/2012 | Zabback et al. |
| 8,204,873 B2 | 6/2012 | Chavan |
| 8,204,875 B2 | 6/2012 | Srinivasan et al. |
| 8,260,803 B2 | 9/2012 | Hsu et al. |
| 8,290,776 B2 | 10/2012 | Moriwaki et al. |
| 8,296,316 B2 | 10/2012 | Jain et al. |
| 8,307,197 B2 | 11/2012 | Koch, III |
| 8,307,343 B2 | 11/2012 | Chaudhuri et al. |
| 8,315,990 B2 | 11/2012 | Barga et al. |
| 8,316,012 B2 | 11/2012 | Abouzied et al. |
| 8,321,450 B2 | 11/2012 | Thatte et al. |
| 8,332,502 B1 | 12/2012 | Neuhaus et al. |
| 8,346,511 B2 | 1/2013 | Schoning et al. |
| 8,352,517 B2 | 1/2013 | Park et al. |
| 8,370,812 B2 | 2/2013 | Feblowitz et al. |
| 8,386,466 B2 | 2/2013 | Park et al. |
| 8,387,076 B2 | 2/2013 | Thatte et al. |
| 8,392,402 B2 | 3/2013 | Mihaila et al. |
| 8,396,886 B1 | 3/2013 | Tsimelzon |
| 8,447,744 B2 | 5/2013 | De Castro Alves et al. |
| 8,458,175 B2 | 6/2013 | Stokes |
| 8,498,956 B2 | 7/2013 | Srinivasan et al. |
| 8,521,867 B2 | 8/2013 | Srinivasan et al. |
| 8,527,458 B2 | 9/2013 | Park et al. |
| 8,543,558 B2 | 9/2013 | Srinivasan et al. |
| 8,572,589 B2 | 10/2013 | Cataldo et al. |
| 8,589,436 B2 | 11/2013 | Srinivasan et al. |
| 8,595,840 B1 | 11/2013 | Malibiran et al. |
| 8,676,841 B2 | 3/2014 | Srinivasan et al. |
| 8,713,038 B2 | 4/2014 | Cohen et al. |
| 8,713,049 B2 | 4/2014 | Jain et al. |
| 8,719,207 B2 | 5/2014 | Ratnam et al. |
| 8,738,572 B2 | 5/2014 | Bird et al. |
| 8,745,070 B2 | 6/2014 | Krisnamurthy |
| 8,762,369 B2 | 6/2014 | Macho et al. |
| 8,775,412 B2 | 7/2014 | Day et al. |
| 8,880,493 B2 | 11/2014 | Chen et al. |
| 9,015,102 B2 | 4/2015 | van Lunteren |
| 9,058,360 B2 | 6/2015 | De Castro Alves et al. |
| 9,098,587 B2 | 8/2015 | Deshmukh et al. |
| 9,110,945 B2 | 8/2015 | Jain |
| 9,189,280 B2 | 11/2015 | Park et al. |
| 9,244,978 B2 | 1/2016 | Alves et al. |
| 9,256,646 B2 | 2/2016 | Deshmukh et al. |
| 9,262,258 B2 | 2/2016 | Alves et al. |
| 9,262,479 B2 | 2/2016 | Deshmukh et al. |
| 9,286,352 B2 | 3/2016 | Park et al. |
| 9,292,574 B2 | 3/2016 | Hsiao et al. |
| 9,305,057 B2 | 4/2016 | De Castro Alves et al. |
| 9,305,238 B2 | 4/2016 | Srinivasan et al. |
| 9,329,975 B2 | 5/2016 | Park et al. |
| 9,361,308 B2 | 6/2016 | Deshmukh et al. |
| 9,390,135 B2 | 7/2016 | Alves et al. |
| 9,418,113 B2 | 8/2016 | Bishnoi et al. |
| 9,430,494 B2 | 8/2016 | Park et al. |
| 9,535,761 B2 | 1/2017 | Park et al. |
| 9,563,663 B2 | 2/2017 | Shukla et al. |
| 9,703,836 B2 | 7/2017 | Hsiao et al. |
| 9,712,645 B2 | 7/2017 | de Castro Alves et al. |
| 9,715,529 B2 | 7/2017 | Park et al. |
| 9,756,104 B2 | 9/2017 | Shukla et al. |
| 9,804,892 B2 | 10/2017 | Park et al. |
| 9,805,095 B2 | 10/2017 | Deshmukh et al. |
| 9,852,186 B2 | 12/2017 | Herwadkar et al. |
| 9,886,486 B2 | 2/2018 | De Castro Alves et al. |
| 2002/0023211 A1 | 2/2002 | Roth et al. |
| 2002/0032804 A1 | 3/2002 | Hunt |
| 2002/0038306 A1* | 3/2002 | Griffin ............ G06F 17/30592 |
| 2002/0038313 A1 | 3/2002 | Klein et al. |
| 2002/0049788 A1 | 4/2002 | Lipkin |
| 2002/0056004 A1 | 5/2002 | Smith et al. |
| 2002/0073399 A1 | 6/2002 | Golden |
| 2002/0116362 A1 | 8/2002 | Li et al. |
| 2002/0116371 A1 | 8/2002 | Dodds et al. |
| 2002/0133484 A1 | 9/2002 | Chau et al. |
| 2002/0169788 A1 | 11/2002 | Lee et al. |
| 2003/0014408 A1 | 1/2003 | Robertson |
| 2003/0037048 A1 | 2/2003 | Kabra et al. |
| 2003/0046673 A1 | 3/2003 | Copeland et al. |
| 2003/0065655 A1 | 4/2003 | Syeda-mahmood |
| 2003/0065659 A1 | 4/2003 | Agarwal et al. |
| 2003/0120682 A1 | 6/2003 | Bestgen et al. |
| 2003/0135304 A1 | 7/2003 | Sroub et al. |
| 2003/0200198 A1 | 10/2003 | Chandrasekar et al. |
| 2003/0212664 A1 | 11/2003 | Breining et al. |
| 2003/0229652 A1 | 12/2003 | Bakalash et al. |
| 2003/0236766 A1 | 12/2003 | Fortuna et al. |
| 2004/0010496 A1 | 1/2004 | Behrendt et al. |
| 2004/0019592 A1 | 1/2004 | Crabtree |
| 2004/0024773 A1 | 2/2004 | Stoffel et al. |
| 2004/0064466 A1 | 4/2004 | Manikutty et al. |
| 2004/0073534 A1 | 4/2004 | Robson |
| 2004/0088404 A1 | 5/2004 | Aggarwal |
| 2004/0117359 A1 | 6/2004 | Snodgrass et al. |
| 2004/0136598 A1 | 7/2004 | Le Leannec et al. |
| 2004/0151382 A1 | 8/2004 | Stellenberg et al. |
| 2004/0153329 A1 | 8/2004 | Casati et al. |
| 2004/0167864 A1 | 8/2004 | Wang et al. |
| 2004/0168107 A1 | 8/2004 | Sharp et al. |
| 2004/0177053 A1 | 9/2004 | Donoho et al. |
| 2004/0201612 A1 | 10/2004 | Hild et al. |
| 2004/0205082 A1 | 10/2004 | Fontoura et al. |
| 2004/0220896 A1 | 11/2004 | Finlay et al. |
| 2004/0220912 A1 | 11/2004 | Manikutty et al. |
| 2004/0220927 A1 | 11/2004 | Murthy et al. |
| 2004/0243590 A1* | 12/2004 | Gu et al. ................ 707/100 |
| 2004/0267760 A1 | 12/2004 | Brundage et al. |
| 2004/0268314 A1 | 12/2004 | Kollman et al. |
| 2005/0010896 A1 | 1/2005 | Meliksetian et al. |
| 2005/0027698 A1 | 2/2005 | Collet et al. |
| 2005/0055338 A1 | 3/2005 | Warner et al. |
| 2005/0065949 A1 | 3/2005 | Warner et al. |
| 2005/0096124 A1 | 5/2005 | Stronach |
| 2005/0097128 A1 | 5/2005 | Ryan et al. |
| 2005/0108368 A1 | 5/2005 | Mohan |
| 2005/0120016 A1 | 6/2005 | Midgley |
| 2005/0154740 A1 | 7/2005 | Day et al. |
| 2005/0174940 A1 | 8/2005 | Iny |
| 2005/0177579 A1 | 8/2005 | Blakeley et al. |
| 2005/0192921 A1 | 9/2005 | Chaudhuri et al. |
| 2005/0204340 A1 | 9/2005 | Ruminer et al. |
| 2005/0229158 A1 | 10/2005 | Thusoo et al. |
| 2005/0273352 A1 | 12/2005 | Moffat et al. |
| 2005/0273450 A1 | 12/2005 | McMillen et al. |
| 2005/0289125 A1 | 12/2005 | Liu et al. |
| 2006/0007308 A1 | 1/2006 | Ide et al. |
| 2006/0015482 A1 | 1/2006 | Beyer et al. |
| 2006/0031204 A1 | 2/2006 | Liu et al. |
| 2006/0047696 A1 | 3/2006 | Larson et al. |
| 2006/0064487 A1 | 3/2006 | Ross |
| 2006/0080646 A1 | 4/2006 | Aman |
| 2006/0085592 A1 | 4/2006 | Ganguly et al. |
| 2006/0089939 A1 | 4/2006 | Broda et al. |
| 2006/0100957 A1 | 5/2006 | Buttler et al. |
| 2006/0100969 A1 | 5/2006 | Wang et al. |
| 2006/0106786 A1 | 5/2006 | Day et al. |
| 2006/0106797 A1 | 5/2006 | Srinivasa et al. |
| 2006/0129554 A1 | 6/2006 | Suyama et al. |
| 2006/0155719 A1 | 7/2006 | Mihaeli et al. |
| 2006/0166704 A1 | 7/2006 | Benco et al. |
| 2006/0167704 A1 | 7/2006 | Nicholls et al. |
| 2006/0167856 A1 | 7/2006 | Angele et al. |
| 2006/0167869 A1 | 7/2006 | Jones |
| 2006/0212441 A1 | 9/2006 | Tang et al. |
| 2006/0224576 A1 | 10/2006 | Liu et al. |
| 2006/0230029 A1 | 10/2006 | Yan |

(56) References Cited

U.S. PATENT DOCUMENTS

| | | |
|---|---|---|
| 2006/0235840 A1 | 10/2006 | Manikutty et al. |
| 2006/0242180 A1 | 10/2006 | Graf et al. |
| 2006/0282429 A1 | 12/2006 | Hernandez-Sherrington et al. |
| 2006/0294095 A1 | 12/2006 | Berk et al. |
| 2007/0016467 A1 | 1/2007 | John et al. |
| 2007/0039049 A1 | 2/2007 | Kupferman et al. |
| 2007/0050340 A1 | 3/2007 | Von Kaenel et al. |
| 2007/0076314 A1 | 4/2007 | Rigney |
| 2007/0118600 A1 | 5/2007 | Arora |
| 2007/0136239 A1 | 6/2007 | Lee et al. |
| 2007/0136254 A1 | 6/2007 | Choi et al. |
| 2007/0156787 A1 | 7/2007 | MacGregor |
| 2007/0156964 A1 | 7/2007 | Sistla |
| 2007/0168154 A1 | 7/2007 | Ericson |
| 2007/0192301 A1 | 8/2007 | Posner |
| 2007/0198479 A1 | 8/2007 | Cai et al. |
| 2007/0022092 A1 | 9/2007 | Nishizawa et al. |
| 2007/0214171 A1 | 9/2007 | Behnen et al. |
| 2007/0226188 A1 | 9/2007 | Johnson et al. |
| 2007/0226239 A1 | 9/2007 | Johnson et al. |
| 2007/0250487 A1 | 10/2007 | Reuther |
| 2007/0271280 A1 | 11/2007 | Chandasekaran |
| 2007/0294217 A1 | 12/2007 | Chen et al. |
| 2008/0005093 A1 | 1/2008 | Liu et al. |
| 2008/0010093 A1 | 1/2008 | LaPlante et al. |
| 2008/0010241 A1 | 1/2008 | Mcgoveran |
| 2008/0016095 A1 | 1/2008 | Bhatnagar et al. |
| 2008/0028095 A1 | 1/2008 | Lang et al. |
| 2008/0033914 A1 | 2/2008 | Cherniack et al. |
| 2008/0034427 A1 | 2/2008 | Cadambi et al. |
| 2008/0046401 A1 | 2/2008 | Lee et al. |
| 2008/0071904 A1 | 3/2008 | Schuba et al. |
| 2008/0077570 A1 | 3/2008 | Tang et al. |
| 2008/0077587 A1 | 3/2008 | Wyschogrod et al. |
| 2008/0077780 A1 | 3/2008 | Zingher |
| 2008/0082484 A1 | 4/2008 | Averbuch et al. |
| 2008/0082514 A1 | 4/2008 | Khorlin et al. |
| 2008/0086321 A1 | 4/2008 | Walton |
| 2008/0098359 A1 | 4/2008 | Ivanov et al. |
| 2008/0098370 A1 | 4/2008 | Fontoura et al. |
| 2008/0110397 A1 | 5/2008 | Son |
| 2008/0114787 A1 | 5/2008 | Kashiyama et al. |
| 2008/0120283 A1 | 5/2008 | Liu et al. |
| 2008/0120321 A1 | 5/2008 | Liu et al. |
| 2008/0162583 A1 | 7/2008 | Brown et al. |
| 2008/0195577 A1 | 8/2008 | Fan et al. |
| 2008/0235298 A1 | 9/2008 | Lin et al. |
| 2008/0243451 A1 | 10/2008 | Feblowitz et al. |
| 2008/0243675 A1 | 10/2008 | Parsons et al. |
| 2008/0250073 A1 | 10/2008 | Nori et al. |
| 2008/0255847 A1 | 10/2008 | Moriwaki et al. |
| 2008/0263039 A1 | 10/2008 | Van Lunteren |
| 2008/0270764 A1 | 10/2008 | McMillen et al. |
| 2008/0275891 A1 | 11/2008 | Park et al. |
| 2008/0281782 A1 | 11/2008 | Agrawal |
| 2008/0301086 A1 | 12/2008 | Gupta |
| 2008/0301124 A1 | 12/2008 | Alves et al. |
| 2008/0301125 A1 | 12/2008 | Alves et al. |
| 2008/0301135 A1 | 12/2008 | Alves et al. |
| 2008/0301256 A1 | 12/2008 | Mcwilliams et al. |
| 2008/0313131 A1 | 12/2008 | Friedman et al. |
| 2009/0006320 A1 | 1/2009 | Ding et al. |
| 2009/0006346 A1 | 1/2009 | Kanthi et al. |
| 2009/0007098 A1 | 1/2009 | Chevrette et al. |
| 2009/0019045 A1 | 1/2009 | Amir et al. |
| 2009/0024622 A1 | 1/2009 | Chkodrov et al. |
| 2009/0043729 A1 | 2/2009 | Liu et al. |
| 2009/0070355 A1 | 3/2009 | Cadarette et al. |
| 2009/0070785 A1 | 3/2009 | Alvez et al. |
| 2009/0070786 A1* | 3/2009 | Alves .................... G06F 9/541 719/318 |
| 2009/0076899 A1 | 3/2009 | Gbodimowo |
| 2009/0088962 A1 | 4/2009 | Jones |
| 2009/0100029 A1 | 4/2009 | Jain et al. |
| 2009/0106189 A1 | 4/2009 | Jain et al. |
| 2009/0106190 A1 | 4/2009 | Srinivasan et al. |
| 2009/0106198 A1 | 4/2009 | Srinivasan et al. |
| 2009/0106214 A1 | 4/2009 | Jain et al. |
| 2009/0106215 A1 | 4/2009 | Jain et al. |
| 2009/0106218 A1 | 4/2009 | Srinivasan et al. |
| 2009/0106321 A1 | 4/2009 | Das et al. |
| 2009/0106440 A1 | 4/2009 | Srinivasan et al. |
| 2009/0112779 A1 | 4/2009 | Wolf et al. |
| 2009/0112802 A1 | 4/2009 | Srinivasan et al. |
| 2009/0112803 A1 | 4/2009 | Srinivasan et al. |
| 2009/0112853 A1 | 4/2009 | Nishizawa et al. |
| 2009/0125550 A1 | 5/2009 | Barga et al. |
| 2009/0125916 A1 | 5/2009 | Lu et al. |
| 2009/0132503 A1 | 5/2009 | Sun et al. |
| 2009/0133041 A1 | 5/2009 | Rahman et al. |
| 2009/0144696 A1 | 6/2009 | Andersen |
| 2009/0172014 A1 | 7/2009 | Huetter |
| 2009/0182779 A1 | 7/2009 | Johnson |
| 2009/0187584 A1 | 7/2009 | Johnson et al. |
| 2009/0192981 A1 | 7/2009 | Papaemmanouil et al. |
| 2009/0216747 A1 | 8/2009 | Li et al. |
| 2009/0216860 A1 | 8/2009 | Li et al. |
| 2009/0222730 A1 | 9/2009 | Wixson et al. |
| 2009/0228431 A1 | 9/2009 | Dunagan et al. |
| 2009/0228434 A1 | 9/2009 | Krishnamurthy et al. |
| 2009/0228465 A1 | 9/2009 | Krishnamurthy et al. |
| 2009/0245236 A1 | 10/2009 | Scott et al. |
| 2009/0248749 A1 | 10/2009 | Gu et al. |
| 2009/0254522 A1 | 10/2009 | Chaudhuri et al. |
| 2009/0257314 A1 | 10/2009 | Davis et al. |
| 2009/0265324 A1 | 10/2009 | Mordvinov et al. |
| 2009/0271529 A1 | 10/2009 | Kashiyama et al. |
| 2009/0282021 A1 | 11/2009 | Bennet et al. |
| 2009/0292979 A1 | 11/2009 | Aggarwal |
| 2009/0293046 A1 | 11/2009 | Cheriton |
| 2009/0300093 A1 | 12/2009 | Griffiths et al. |
| 2009/0300181 A1 | 12/2009 | Marques |
| 2009/0300580 A1 | 12/2009 | Heyhoe et al. |
| 2009/0300615 A1 | 12/2009 | Andrade et al. |
| 2009/0313198 A1 | 12/2009 | Kudo et al. |
| 2009/0319501 A1 | 12/2009 | Goldstein et al. |
| 2009/0327102 A1 | 12/2009 | Maniar et al. |
| 2009/0327257 A1 | 12/2009 | Abouzeid et al. |
| 2010/0017379 A1 | 1/2010 | Naibo et al. |
| 2010/0017380 A1 | 1/2010 | Naibo et al. |
| 2010/0022627 A1 | 1/2010 | Scherer et al. |
| 2010/0023498 A1 | 1/2010 | Dettinger et al. |
| 2010/0036803 A1 | 2/2010 | Vemuri et al. |
| 2010/0036831 A1* | 2/2010 | Vemuri et al. .................... 707/5 |
| 2010/0049710 A1 | 2/2010 | Young, Jr. et al. |
| 2010/0057663 A1 | 3/2010 | Srinivasan et al. |
| 2010/0057727 A1 | 3/2010 | Srinivasan et al. |
| 2010/0057735 A1 | 3/2010 | Srinivasan et al. |
| 2010/0057736 A1 | 3/2010 | Srinivasan et al. |
| 2010/0057737 A1 | 3/2010 | Srinivasan et al. |
| 2010/0094838 A1 | 4/2010 | Kozak |
| 2010/0106710 A1 | 4/2010 | Nishikawa |
| 2010/0106946 A1 | 4/2010 | Imaki et al. |
| 2010/0125572 A1 | 5/2010 | Poblete et al. |
| 2010/0125574 A1 | 5/2010 | Navas |
| 2010/0125584 A1 | 5/2010 | Navas |
| 2010/0138405 A1* | 6/2010 | Mihaila et al. ................ 707/713 |
| 2010/0161589 A1 | 6/2010 | Nica et al. |
| 2010/0223283 A1 | 9/2010 | Lee et al. |
| 2010/0223305 A1 | 9/2010 | Park et al. |
| 2010/0223437 A1 | 9/2010 | Park et al. |
| 2010/0223606 A1 | 9/2010 | Park et al. |
| 2010/0250572 A1 | 9/2010 | Chen |
| 2010/0293135 A1 | 11/2010 | Candea et al. |
| 2010/0312756 A1 | 12/2010 | Zhang et al. |
| 2010/0318652 A1 | 12/2010 | Samba |
| 2010/0332401 A1 | 12/2010 | Prahlad et al. |
| 2011/0004621 A1 | 1/2011 | Kelley et al. |
| 2011/0016123 A1 | 1/2011 | Pandey et al. |
| 2011/0016160 A1 | 1/2011 | Zhang et al. |
| 2011/0022618 A1 | 1/2011 | Thatte et al. |
| 2011/0023055 A1 | 1/2011 | Thatte et al. |
| 2011/0029484 A1 | 2/2011 | Park et al. |
| 2011/0029485 A1 | 2/2011 | Park et al. |

(56) References Cited

U.S. PATENT DOCUMENTS

| | | |
|---|---|---|
| 2011/0035253 A1 | 2/2011 | Mason et al. |
| 2011/0040746 A1 | 2/2011 | Handa et al. |
| 2011/0040827 A1 | 2/2011 | Katsunuma et al. |
| 2011/0055192 A1 | 3/2011 | Tang et al. |
| 2011/0055197 A1 | 3/2011 | Chavan |
| 2011/0084967 A1 | 4/2011 | De Pauw et al. |
| 2011/0093162 A1 | 4/2011 | Nielsen et al. |
| 2011/0105857 A1 | 5/2011 | Zhang et al. |
| 2011/0131588 A1 | 6/2011 | Allam et al. |
| 2011/0161321 A1 | 6/2011 | De Castro et al. |
| 2011/0161328 A1 | 6/2011 | Park et al. |
| 2011/0161352 A1 | 6/2011 | De Castro et al. |
| 2011/0161356 A1 | 6/2011 | De Castro et al. |
| 2011/0161397 A1 | 6/2011 | Bekiares et al. |
| 2011/0173231 A1 | 7/2011 | Drissi et al. |
| 2011/0173235 A1 | 7/2011 | Aman et al. |
| 2011/0196839 A1 | 8/2011 | Smith et al. |
| 2011/0196891 A1 | 8/2011 | De Castro et al. |
| 2011/0213802 A1 | 9/2011 | Singh et al. |
| 2011/0246445 A1 | 10/2011 | Mishra |
| 2011/0270879 A1 | 11/2011 | Srinivasan et al. |
| 2011/0282812 A1 | 11/2011 | Chandramouli et al. |
| 2011/0295841 A1 | 12/2011 | Sityon et al. |
| 2011/0302164 A1 | 12/2011 | Krishnamurthy et al. |
| 2011/0313844 A1 | 12/2011 | Chandramouli et al. |
| 2011/0314019 A1 | 12/2011 | Jimenez Peris et al. |
| 2011/0321057 A1 | 12/2011 | Mejdrich et al. |
| 2012/0016866 A1 | 1/2012 | Dunagan |
| 2012/0041934 A1 | 2/2012 | Srinivasan et al. |
| 2012/0072455 A1 | 3/2012 | Jain et al. |
| 2012/0116982 A1 | 5/2012 | Yoshida et al. |
| 2012/0130963 A1 | 5/2012 | Luo et al. |
| 2012/0131139 A1 | 5/2012 | Siripurapu et al. |
| 2012/0166417 A1 | 6/2012 | Chandramouli et al. |
| 2012/0166421 A1 | 6/2012 | Cammert et al. |
| 2012/0166469 A1 | 6/2012 | Cammert et al. |
| 2012/0191697 A1 | 7/2012 | Sherman et al. |
| 2012/0233107 A1 | 9/2012 | Roesch et al. |
| 2012/0259910 A1 | 10/2012 | Andrade et al. |
| 2012/0278473 A1 | 11/2012 | Griffiths |
| 2012/0284420 A1 | 11/2012 | Shukla et al. |
| 2012/0290715 A1 | 11/2012 | Dinger et al. |
| 2012/0291049 A1 | 11/2012 | Park et al. |
| 2012/0324453 A1 | 12/2012 | Chandramouli et al. |
| 2013/0014088 A1 | 1/2013 | Park et al. |
| 2013/0031567 A1 | 1/2013 | Nano et al. |
| 2013/0046725 A1 | 2/2013 | Cammert et al. |
| 2013/0117317 A1 | 5/2013 | Wolf |
| 2013/0144866 A1 | 6/2013 | Jerzak et al. |
| 2013/0191370 A1 | 7/2013 | Chen et al. |
| 2013/0262399 A1 | 10/2013 | Eker et al. |
| 2013/0275452 A1 | 10/2013 | Krishnamurthy et al. |
| 2013/0332240 A1 | 12/2013 | Patri et al. |
| 2014/0019194 A1 | 1/2014 | Anne et al. |
| 2014/0059109 A1 | 2/2014 | Jugel et al. |
| 2014/0082013 A1 | 3/2014 | Wolf et al. |
| 2014/0095425 A1 | 4/2014 | Sipple et al. |
| 2014/0095444 A1 | 4/2014 | Deshmukh et al. |
| 2014/0095445 A1 | 4/2014 | Deshmukh et al. |
| 2014/0095446 A1 | 4/2014 | Deshmukh et al. |
| 2014/0095447 A1 | 4/2014 | Deshmukh et al. |
| 2014/0095462 A1 | 4/2014 | Park et al. |
| 2014/0095471 A1 | 4/2014 | Deshmukh et al. |
| 2014/0095483 A1 | 4/2014 | Toillion et al. |
| 2014/0095525 A1 | 4/2014 | Hsiao et al. |
| 2014/0095529 A1 | 4/2014 | Deshmukh et al. |
| 2014/0095533 A1 | 4/2014 | Shukla et al. |
| 2014/0095535 A1 | 4/2014 | Deshmukh et al. |
| 2014/0095537 A1 | 4/2014 | Park et al. |
| 2014/0095540 A1 | 4/2014 | Hsiao et al. |
| 2014/0095541 A1 | 4/2014 | Herwadkar et al. |
| 2014/0095543 A1 | 4/2014 | Hsiao et al. |
| 2014/0136514 A1 | 5/2014 | Jain et al. |
| 2014/0156683 A1 | 6/2014 | de Castro Alves |
| 2014/0172506 A1 | 6/2014 | Parsell et al. |
| 2014/0172914 A1 | 6/2014 | Elnikety et al. |
| 2014/0201225 A1 | 7/2014 | Deshmukh et al. |
| 2014/0201355 A1 | 7/2014 | Bishnoi et al. |
| 2014/0236983 A1 | 8/2014 | Alves et al. |
| 2014/0237289 A1 | 8/2014 | de Castro Alves et al. |
| 2014/0237487 A1 | 8/2014 | Prasanna et al. |
| 2014/0324530 A1 | 10/2014 | Thompson et al. |
| 2014/0358959 A1 | 12/2014 | Bishnoi et al. |
| 2014/0379712 A1 | 12/2014 | Lafuente Alvarez |
| 2015/0007320 A1 | 1/2015 | Liu et al. |
| 2015/0156241 A1 | 6/2015 | Shukla et al. |
| 2015/0161214 A1 | 6/2015 | Kali et al. |
| 2015/0227415 A1 | 8/2015 | Alves et al. |
| 2015/0363464 A1 | 12/2015 | Alves et al. |
| 2015/0381712 A1 | 12/2015 | De Castro Alves et al. |
| 2016/0034311 A1 | 2/2016 | Park et al. |
| 2016/0085809 A1 | 3/2016 | De Castro et al. |
| 2016/0085810 A1 | 3/2016 | De Castro et al. |
| 2016/0103882 A1 | 4/2016 | Deshmukh et al. |
| 2016/0127517 A1 | 5/2016 | Shcherbakov et al. |
| 2016/0140180 A1 | 5/2016 | Park et al. |
| 2016/0154855 A1 | 6/2016 | Hsiao et al. |
| 2016/0283555 A1 | 9/2016 | Alves et al. |
| 2017/0024912 A1 | 1/2017 | De Castro et al. |
| 2017/0075726 A1 | 3/2017 | Park et al. |

FOREIGN PATENT DOCUMENTS

| | | | |
|---|---|---|---|
| CN | 102665207 | | 9/2012 |
| CN | 102892073 | | 1/2013 |
| CN | 104885077 | | 9/2015 |
| CN | 104937591 | | 9/2015 |
| CN | 105593854 | | 5/2016 |
| EP | 1 241 589 A2 | | 9/2002 |
| EP | 2474922 | | 7/2012 |
| EP | 2946314 | | 11/2015 |
| EP | 2946527 | | 11/2015 |
| EP | 2959408 | | 12/2015 |
| JP | 2002-251233 A | | 9/2002 |
| JP | 2006338432 | | 12/2006 |
| JP | 2007-328716 A | | 12/2007 |
| JP | 2008-541225 A | | 11/2008 |
| JP | 2009-134689 A | | 6/2009 |
| JP | 2009171193 | | 7/2009 |
| JP | 2010-108073 A | | 5/2010 |
| JP | 2011-038818 A | | 2/2011 |
| JP | 2015536001 | | 12/2015 |
| JP | 2016500167 | | 1/2016 |
| WO | 00/49533 A2 | | 8/2000 |
| WO | 0118712 | | 3/2001 |
| WO | 10/59602 A1 | | 8/2001 |
| WO | 01/65418 A1 | | 9/2001 |
| WO | 03/030031 A2 | | 4/2003 |
| WO | 2007122347 | | 11/2007 |
| WO | WO2009/119811 A1 | | 10/2009 |
| WO | 2010050582 | | 5/2010 |
| WO | 2012/037511 A1 | | 3/2012 |
| WO | 2012050582 | | 4/2012 |
| WO | WO-2012/050582 A1 * | 4/2012 | ........ G06F 17/30516 |
| WO | 2012/154408 A1 | | 11/2012 |
| WO | 2012/158360 A1 | | 11/2012 |
| WO | 2014000819 | | 1/2014 |
| WO | 2015191120 | | 12/2015 |
| WO | 2016048912 | | 3/2016 |

OTHER PUBLICATIONS

Babu et al., "Exploiting k-Constraints to Reduce Memory Overhead in Continuous Queries Over Data Streams", ACM Transactions on Database Systems (TODS) vol. 29 Issue 3, Sep. 2004, [retrieved on Nov. 13, 2014], retrieved from the internet <URL:http://dl.acm.org/citation.cfm?id=1016032>.*

Chen et al., "NiagaraCQ: A Scaleable Continuous Query Sytem for Internet Databases", Newsletter: ACM SIGMOD Record vol. 29 Issue 2, Jun. 2000, [retrieved on Nov. 13, 2014], retrieved from the internet <URL:http://dl.acm.org/citation.cfm?id=335432>.*

(56) References Cited

OTHER PUBLICATIONS

"SQL Subqueries"—Dec. 3, 2011, [retreieved on Nov. 7, 2014], retrieved from the internet <URL: https://web.archive.org/web/20111203033655/http://docs.oracle.com/cd/B28359_01/server.111/b28286/queries007.htm>.*
"Caching Data with SqlDataSource Control"—Jul. 4, 2011, [retrieved on Nov. 12, 2014], retrieved from the internet <URL:https://web.archive.org/web/20110704142936/http://msdn.microsoft.com/en-us/library/z56y8ksb(v=VS.100).aspx>.*
"SCD—Slowing Changing Dimensions in a DataWarehouse"—Aug. 7, 2011, [retrieved on Nov. 10, 2014], retrieved from the internet <URL:https://web.archive.org/web/20110807085325/http://etl-tools.info/en/scd.html>.*
Buza, Antal. "Extension of CQL over Dynamic Databases." J. UCS 12, No. 9 (2006): 1165-1176. [retrieved on Jun. 16, 2015], [retrieved on the internet URL<http://www.jucs.org/jucs_12_9/extension_of_cql_over%20/jucs_12_09_1165_1176_buza.pdf>].*
SQL Tutorial-In, Tizag.com, http://web.archive.org/web/20090216215219/http://www.tizag.com/sgiTutorial/sqlin.php, Feb. 16, 2009, pp. 1-3.
U.S. Appl. No. 12/548,187, Final Office Action, dated Jun. 10, 2013, 18 pages.
U.S. Appl. No. 12/548,222, Notice of Allowance, dated Jul. 18, 2013, 12 pages.
U.S. Appl. No. 13/102,665, Final Office Action, dated Jul. 9, 2013, 17 pages.
U.S. Appl. No. 13/107,742, Final Office Action, dated Jul. 3, 2013, 19 pages.
Notice of Allowance for U.S. Appl. No. 11/977,437 dated Jul. 10, 2013, 10 pages.
Business Process Management (BPM), Datasheet [online]. IBM, [retrieved on Jan. 28, 2013]. Retrieved from the Internet: <URL: http://www-142.ibm.com/software/products/us/en/category/BPM-SOFTWARE>.
What is BPM? , Datasheet [online]. IBM, [retrieved on Jan. 28, 2013]. Retrieved from the Internet: <URL: http://www-01.ibm.com/software/info/bpm/whatis-bpm/>.
U.S Appl. No. 12/548,281, Final Office Action dated Oct. 10, 2013, 21 pages.
U.S Appl. No. 12/548,290, Notice of Allowance dated Sep. 11, 2013, 6 pages.
U.S Appl. No. 12/949,081, Final Office Action dated Aug. 27, 2013, 13 pages.
U.S Appl. No. 13/089,556, Final Office Action dated Aug. 29, 2013, 10 pages.
U.S Appl. No. 13/177,748, Non-Final Office Action dated Aug. 30, 2013, 24 pages.
U.S Appl. No. 13/193,377, Notice of Allowance dated Aug. 30, 2013, 19 pages.
Oracle Application Server, Enterprise Deployment Guide, 10g Release 3 (10.1.3.2.0), B32125-02, Oracle, Apr. 2007, 120 pages.
Oracle Database, SQL Language Reference 11 g Release 1 (11.1), B28286-02, Oracle, Sep. 2007, 1496 pages.
Esper Reference Documentation, Copyright 2007, Ver. 1.12.0, 2007, 158 pages.
Stream Query Repository: Online Auctions, at URL: http://www-db.stanford.edu/stream/sgr/onauc.html#queryspecsend, Dec. 2, 2002, 2 pages.
Esper Reference Documentation, Copyright 2008, ver. 2.0.0, 2008, 202 pages.
Oracle Database Data Cartridge Developer's Guide, B28425-03, 11 g Release 1 (11.1), Oracle, Mar. 2008, 372 pages.
Oracle Application Server, Administrator's Guide, 10g Release 3 (10.1.3.2.0), B32196-01, Oracle, Jan. 2007, 376 pages.
Oracle Application Server 10g, Release 2 and 3, New Features Overview, An Oracle White Paper, Oracle., Oct. 2005, 48 pages.
Oracle Database, SQL Reference, 10g Release 1 (10.1), Part No. B10759-01, Dec. 2003, pp. 7-1 to 7-17; 7-287 to 7-290; 14-61 to 14-74.
Complex Event Processing in the Real World, An Oracle White Paper., Sep. 2007, 13 pages.
Coral8 Complex Event Processing Technology Overview, Coral8, Inc., Make it Continuous, Copyright 2007 Coral8, Inc., 2007, pp. 1-8.
Creating WebLogic Domains Using the Configuration Wizard, BEA Products, Version 10.0, Dec. 2007, 78 pages.
Creating Weblogic Event Server Applications, BEA WebLogic Event Server, Version 2.0, Jul. 2007, 90 pages.
Dependency Injection, Wikipedia, printed on Apr. 29, 2011, at URL: D http:en.wikipedia.org/w/index.php? title=DependencLinjection &0ldid=260831402,, Dec. 30, 2008, pp. 1-7.
Deploying Applications to WebLogic Server, BEA WebLogic Server, ver. D 10.0, Mar. 30, 2007, 164 pages.
Developing Applications with Weblogic Server, BEA WebLogic Server, ver. D 10.0, Mar. 30, 2007, 254 pages.
EPL Reference, BEA WebLogic Event Server, ver. 2.0, Jul. 2007, 82 pages.
Esper Reference Documentation Version 3.1.0, EsperTech, retrieved from internet at URL: http://esper.codehaus.org/esper-3.1.0/doc/reference/en/pdf/esper_reference.pdf, 2009, 293 pages.
Fast Track Deployment and Administrator Guide for BEA WebLogic Server, BEA WebLogic Server 10.0 Documentation, printed on May 10, 2010, at URL:http://download.oracle.com/docs/cd/E13222_01 /wls/docs1 OO/quickstart/quick_start. html, May 10, 2010, 1page.
Getting Started with WebLogic Event Server, BEA WebLogic Event Serverver 2.0, Jul. 2007, 66 pages.
High Availability Guide, Oracle Application Server, 10g Release 3 (10.1.3.2.0), B32201-01, Jan. 2007, 314 pages.
Installing Weblogic Real Time, BEA WebLogic Real Time, Ver. 2.0, Jul. 2007, 64 pages.
Introduction to BEA WebLogic Server and BEA WebLogic Express, BEA WebLogic Server, Ver. 10.0, Mar. 2007, 34 pages.
Introduction to WebLogic Real Time, BEA WebLogic Real Time, ver. 2.0, Jul. 2007, 20 pages.
Jboss Enterprise Application Platform 4.3 Getting Started Guide CP03, for Use with Jboss Enterprise Application Platform 4.3 Cumulative Patch 3, Jboss a division of Red Hat, Red Hat Documentation Group, Copyright 2008, Red Hat, Inc., Sep. 2007, 68 pages.
Managing Server Startup and Shutdown, BEA WebLogic Server, ver. 10.0, Mar. 30, 2007, 134 pages.
Matching Behavior, .NET Framework Developer's Guide, Microsoft Corporation, Retrieved on: Jul. 1, 2008, URL: http://msdn.microsoft.com/en-us/library/Oyzc2ybO(pri nter).aspx, 2008, pp. 1-2.
New Project Proposal for Row Pattern Recognition—Amendment to SQL with Application to Streaming Data Queries, H2-2008-027, H2 Teleconference Meeting, Jan. 9, 2008, pp. 1-6.
Oracle CEP Getting Started, Release 11 gR1 (11.1.1) E14476-01, May 2009, 172 pages.
Oracle Complex Event Processing CQL Language Reference, 11g Release 1 (11.1.1) E12048-01, Apr. 2010, 540 pages.
OSGI Service Platform Core Specification, The OSGI Alliance, OSGI Alliance, ver. 4.1, release 4, Apr. 2007, 288 pages.
Release Notes, BEA WebLogic Event Server, Ver. 2.0, Jul. 2007, 8 pages.
Spring Dynamic Modules for OSGi Service Platforms product documentation, SpringSource, D, Jan. 2008, 71 pages.
Stream Base New and Noteworthy, Stream Base, Jan. 1, 2010, 878 pages.
Stream Query Repository: Online Auctions (CQL Queries)., Retrieved from: URL: http://www-db.stanford.edu/strem/sqr/cql/onauc.html, Dec. 2, 2002, 4 pages.
Stream: The Stanford Stream Data Manager, IEEE Data Engineering Bulletin., Mar. 2003, pp. 1-8.
Stream: The Stanford Stream Data Manager, Retrieved from: URL:http://infolab.stanford.edu/stream/, Jan. 5, 2006, pp. 1-9.
Understanding Domain Configuration, BEA WebLogic Server, Ver. 10.0, Mar. 30, 2007, 38 pages.
WebLogic Event Server Administration and Configuration Guide, BEA WebLogic Event D Server, Version. 2.0, Jul. 2007, 108 pages.

(56) References Cited

OTHER PUBLICATIONS

WebLogic Event Server Reference, BEA WebLogic Event Server, Version. 2.0, Jul. 2007, 52 pages.
Weblogic Server Performance and Tuning, BEA WebLogic Server, Ver. 10.0, Mar. 30, 2007, 180 pages.
WebSphere Application Server V6.1 Problem Determination: IBM Redpaper Collection, WebSphere Software, IBM/Redbooks, ,., Dec. 2007, 634 pages.
U.S. Appl. No. 10/948,523, Final Office Action dated Jul. 6, 2007, 37 pages.
U.S. Appl. No. 10/948,523, Non-Final Office Action dated Dec. 11, 2007, 47 pages.
U.S. Appl. No. 10/948,523, Notice of Allowance dated Dec. 1, 2010, 17 pages.
U.S. Appl. No. 10/948,523, Notice of Allowance dated Jul. 8, 2008, 30 pages.
U.S. Appl. No. 10/948,523, Office Action dated Jan. 22, 2007, 31 pages.
U.S. Appl. No. 10/948,523, Supplemental Notice of Allowance dated Jul. 17, 2008, 17 pages.
U.S. Appl. No. 10/948,523, Supplemental Notice of Allowance dated Aug. 25, 2008, 3 pages.
U.S. Appl. No. 11/601,415, Advisory Action dated Aug. 18, 2009, 3 pages.
U.S. Appl. No. 11/601,415, Final Office Action dated Jul. 2, 2012.
U.S. Appl. No. 11/601,415, Final Office Action dated May 27, 2009, 26 pages.
U.S. Appl. No. 11/601,415, Final Office Action dated Jun. 30, 2010, 45 pages.
U.S. Appl. No. 11/601,415, Non-Final Office Action dated Sep. 17, 2008, 10 pages.
U.S. Appl. No. 11/601,415, Non-Final Office Action dated Nov. 30, 2009, 32 pages.
U.S. Appl. No. 11/601,415, Office Action dated Dec. 9, 2011.
U.S. Appl. No. 11/873,407, Final Office Action dated Apr. 26, 2010, 11 pages.
U.S. Appl. No. 11/873,407, Non-Final Office Action dated Nov. 13, 2009, 7 pages.
U.S. Appl. No. 11/873,407, Notice of Allowance dated Nov. 10, 2010, 14 pages.
U.S. Appl. No. 11/873,407, Notice of Allowance dated Mar. 7, 2011, 8 pages.
U.S. Appl. No. 11/874,197, Final Office Action dated Aug. 12, 2011, 26 pages.
U.S. Appl. No. 11/874,197, Final Office Action dated Jun. 29, 2010, 17 pages.
U.S. Appl. No. 11/874,197, Non-Final Office Action dated Dec. 22, 2010, 22 pages.
U.S. Appl. No. 11/874,197, Office Action dated Nov. 10, 2009, 14 pages.
U.S. Appl. No. 11/874,202, Final Office Action dated Jun. 8, 2010, 200 pages.
U.S. Appl. No. 11/874,202, Non-Final Office Action dated Dec. 3, 2009, 20 pages.
U.S. Appl. No. 11/874,202, Notice of Allowance dated Mar. 31, 2011, 12 pages.
U.S. Appl. No. 11/874,202, Notice of Allowance dated Dec. 22, 2010, 29 pages.
U.S. Appl. No. 11/874,850, Notice of Allowance dated Jan. 27, 2010, 11 pages.
U.S. Appl. No. 11/874,850, Notice of Allowance dated Nov. 24, 2009, 17 pages.
U.S. Appl. No. 11/874,850, Notice of Allowance dated Dec. 11, 2009, 5 pages.
U.S. Appl. No. 11/874,896, Final Office Action dated Jul. 23, 2010, 28 pages.
U.S. Appl. No. 11/874,896, Non-Final Office Action dated Dec. 8, 2009, 19 pages.
U.S. Appl. No. 11/874,896, Non-Final Office Action dated Nov. 22, 2010, 25 pages.
U.S. Appl. No. 11/874,896, Notice of Allowance dated Jun. 23, 2011, 30 pages.
U.S. Appl. No. 11/927,681, Non-Final Office Action dated Mar. 24, 2011, 17 pages.
U.S. Appl. No. 11/927,681, Notice of Allowance dated Jul. 1, 2011, 8 pages.
U.S. Appl. No. 11/927,683, Final Office Action dated Sep. 1, 2011, 18 pages.
U.S. Appl. No. 11/927,683, Non-Final Office Action dated Mar. 24, 2011, 13 pages.
U.S. Appl. No. 11/927,683, Notice of Allowance dated Nov. 9, 2011, 10 pages.
U.S. Appl. No. 11/977,437, Final Office Action dated Apr. 8, 2010, 18 pages.
U.S. Appl. No. 11/977,437, Non-Final Office Action dated Oct. 13, 2009, 9 pages.
U.S. Appl. No. 11/977,437, Notice of Allowance dated Mar. 4, 2013, 9 pages.
U.S. Appl. No. 11/977,437, Office Action dated Aug. 3, 2012.
U.S. Appl. No. 11/977,439, Non-Final Office Action dated Apr. 13, 2010, 7 pages.
U.S. Appl. No. 11/977,439, Notice of Allowance dated Mar. 16, 2011, 10 pages.
U.S. Appl. No. 11/977,439, Notice of Allowance dated Aug. 18, 2010, 11 pages.
U.S. Appl. No. 11/977,439, Notice of Allowance dated Sep. 28, 2010, 6 pages.
U.S. Appl. No. 11/977,439, Notice of Allowance dated Nov. 24, 2010, 8 pages.
U.S. Appl. No. 11/977,440, Notice of Allowance dated Oct. 7, 2009, 6 pages.
U.S. Appl. No. 12/193,377, Final Office Action dated Jan. 17, 2013, 24 pages.
U.S. Appl. No. 12/395,871, Non-Final Office Action dated May 27, 2011, 7 pages.
U.S. Appl. No. 12/395,871, Notice of Allowance dated May 4, 2012, 27 pages.
U.S. Appl. No. 12/395,871, Office Action dated Oct. 19, 2011, 33 pages.
U.S. Appl. No. 12/396,008, Non-Final Office Action dated Jun. 8, 2011, 10 pages.
U.S. Appl. No. 12/396,008, Notice of Allowance dated Nov. 16, 2011, 5 pages.
U.S. Appl. No. 12/396,464, Final Office Action dated Jan. 16, 2013, 17 pages.
U.S. Appl. No. 12/396,464, Non-Final Office Action dated Sep. 7, 2012, 18 pages.
U.S. Appl. No. 12/506,891, Notice of Allowance dated Jul. 25, 2012, 8 pages.
U.S. Appl. No. 12/506,891, Office Action dated Dec. 14, 2011, 41 pages.
U.S. Appl. No. 12/506,905, Advisory Action dated Nov. 6, 2012, 6 pages.
U.S. Appl. No. 12/506,905, Notice of Allowance dated Dec. 14, 2012, 15 pages.
U.S. Appl. No. 12/506,905, Office Action dated Aug. 9, 2012, 42 pages.
U.S. Appl. No. 12/506,905, Office Action dated Mar. 26, 2012, 86 pages.
U.S. Appl. No. 12/534,384, Notice of Allowance dated May 7, 2013, 12 pages.
U.S. Appl. No. 12/534,384, Office Action dated Feb. 28, 2012, 38 pages.
U.S. Appl. No. 12/534,384, Office Action dated Feb. 12, 2013, 14 pages.
U.S. Appl. No. 12/534,398, Final Office Action dated Jun. 6, 2012, 27 pages.
U.S. Appl. No. 12/534,398, Notice of Allowance dated Nov. 27, 2012, 10 pages.
U.S. Appl. No. 12/534,398, Office Action dated Nov. 1, 2011, 32 pages.
U.S. Appl. No. 12/548,187, Non Final Office Action dated Sep. 27, 2011, 19 pages.

(56) References Cited

OTHER PUBLICATIONS

U.S. Appl. No. 12/548,187, Non-Final Office Action dated Apr. 9, 2013, 17 pages.
U.S. Appl. No. 12/548,187, Office Action dated Jun. 20, 2012, 31 pages.
U.S. Appl. No. 12/548,209, Notice of Allowance dated Oct. 24, 2012, 22 pages.
U.S. Appl. No. 12/548,209, Office Action dated Apr. 16, 2012, 40 pages.
U.S. Appl. No. 12/548,222, Non-Final Office Action dated Apr. 10, 2013, 16 pages.
U.S. Appl. No. 12/548,222, Non-Final Office Action dated Oct. 19, 2011, 19 pages.
U.S. Appl. No. 12/548,222, Office Action dated Jun. 20, 2012, 29 pages.
U.S. Appl. No. 12/548,281, Non-Final Office Action dated Apr. 12, 2013, 16 pages.
U.S. Appl. No. 12/548,281, Non-Final Office Action dated Oct. 3, 2011, 20 pages.
U.S. Appl. No. 12/548,281, Office Action dated Jun. 20, 2012, 29 pages.
U.S. Appl. No. 12/548,290, Final Office Action dated Jul. 30, 2012, 34 pages.
U.S. Appl. No. 12/548,290, Non-Final Office Action dated Oct. 3, 2011, 17 pages.
U.S. Appl. No. 12/548,290, Non-Final Office Action dated Apr. 15, 2013, 17 pages.
U.S. Appl. No. 12/874,197, Notice of Allowance dated Jun. 22, 2012.
U.S. Appl. No. 12/913,636, Final Office Action dated Jan. 8, 2013, 21 pages.
U.S. Appl. No. 12/913,636, Office Action dated Jun. 7, 2012.
U.S. Appl. No. 12/949,081, filed Nov. 18, 2010.
U.S. Appl. No. 12/949,081, Non-Final Office Action dated Jan. 9, 2013, 12 pages.
U.S. Appl. No. 12/957,194, filed Nov. 30, 2010.
U.S. Appl. No. 12/957,194, Non-Final Office Action dated Dec. 7, 2012, 11 pages.
U.S. Appl. No. 12/957,194, Notice of Allowance dated Mar. 20, 2013, 9 pages.
U.S. Appl. No. 12/957,201, filed Nov. 30, 2010.
U.S. Appl. No. 12/957,201, Final Office Action dated Apr. 25, 2013, 11 pages.
U.S. Appl. No. 12/957,201, Office Action dated Dec. 19, 2012, 15 pages.
U.S. Appl. No. 13/089,556, Non-Final Office Action dated Apr. 10, 2013, 10 pages.
U.S. Appl. No. 13/089,556, Office Action dated Nov. 6, 2012, 13 pages.
U.S. Appl. No. 13/089,556, filed Apr. 19, 2011.
U.S. Appl. No. 13/102,665, Office Action dated Feb. 1, 2013, 14 pages.
U.S. Appl. No. 13/107,742, Non-Final Office Action dated Feb. 14, 2013, 16 pages.
U.S. Appl. No. 13/184,528, Notice of Allowance dated Mar. 1, 2012.
U.S. Appl. No. 13/193,377, Office Action dated Jan. 17, 2013, 25 pages.
U.S. Appl. No. 13/193,377, Office Action dated Aug. 23, 2012, 48 pages.
U.S. Appl. No. 13/244,272, Final Office Action dated Mar. 28, 2013, 29 pages.
U.S. Appl. No. 13/244,272, Office Action dated Oct. 4, 2012.
U.S. Appl. No. 13/396,464, Office Action dated Sep. 7, 2012.
Abadi, et al., Yes Aurora: A Data Stream Management System, International Conference on Management of Data, Proceedings of the 2003 ACM SIGMOD International Conference on Management of Data, 2003, 4 pages.
Aho, et al., Efficient String Matching: An Aid to Bibliographic Search, Communications of the ACM, vol. 18, No. 6, Association for Computing Machinery, Inc., Jun. 1975, pp. 333-340.
Arasu, et al., An Abstract Semantics and Concrete Language for Continuous Queries over Streams and Relations, 9th International Workshop on Database programming languages, Sep. 2003, 11 pages.
Arasu, et al., An Abstract Semantics and Concrete Language for Continuous Queries over Streams and Relations, 9th International Workshop on Database programming languages, Sep. 2003, 12 pages.
Arasu, et al., CQL: A language for Continuous Queries over Streams and Relations, Lecture Notes in Computer Science vol. 2921, 2004, pp. 1-19.
Arasu, et al., STREAM: The Stanford Data Stream Management System, Department of Computer Science, Stanford University, 2004, p. 21.
Arasu, et al., The CQL Continuous Query Language: Semantic Foundations and Query Execution, Stanford University, The VLDB Journal—The International Journal on Very Large Data Bases, vol. 15, No. 2, Springer-Verlag New York, Inc., Jun. 2006, pp. 1-32.
Avnur, et al., Eddies: Continuously Adaptive Query Processing, In Proceedings of the 2000 ACM SIGMOD International Conference on Data, Dallas TX, May 2000, 12 pages.
Avnur, et al., Eddies: Continuously Adaptive Query Processing, slide show, believed to be prior to Oct. 17, 2007, 4 pages.
Babu, et al., Continuous Queries over Data Streams, SIGMOD Record, vol. 30, No. 3, Sep. 2001, pp. 109-120.
Bai, et al., A Data Stream Language and System Designed for Power and Extensibility, Conference on Information and Knowledge Management, Proceedings of the 15th ACM D International Conference on Information and Knowledge Management, Arlington, Virginia, Copyright 2006, ACM Press., Conference on Information and Knowledge Management, Proceedings of the 15th ACM D International Conference on Information and Knowledge Management, Arlington, Virginia, Copyright 2006, ACM Press., Nov. 5-11, 2006, 10 pages.
Bose, et al., A Query Algebra for Fragmented XML Stream Data, 9th International Conference on Data Base Programming Languages (DBPL), Sep. 2003, 11 pages.
Buza, Extension of CQL over Dynamic Databases, Journal of Universal Computer Science, vol. 12, No. 9, Sep. 28, 2006, pp. 1165-1176.
Carpenter, User Defined Functions, Retrieved from: URL: http://www.sqlteam.comitemprint.asp?ItemID=979, Oct. 12, 2000, 4 pages.
Chan, et al., Efficient Filtering of XML documents with Xpath expressions, VLDB Journal D, 2002, pp. 354-379.
Chandrasekaran, et al., TelegraphCQ: Continuous Dataflow Processing for an Uncertain World, Proceedings of CIDR, 2003, 12 pages.
Chen, et al., NiagaraCQ: A Scalable Continuous Query System for Internet Databases, Proceedings of the 2000 SIGMOD International Conference on Management of Data., May 2000, pp. 379-390.
Colyer, et al., Spring Dynamic Modules Reference Guide, Copyright, ver. 1.0.3, 2006-2008, 73 pages.
Colyer, et al., Spring Dynamic Modules Reference Guide, Ver. 1.1.3, 2006-2008, 96 pages.
Conway, An Introduction to Data Stream Query Processing, Truviso, Inc., URL: http://neilconway.org/talks/streamjntro.pdf, May 24, 2007, 71 pages.
Demers, et al., Towards Expressive Publish/Subscribe Systems, Proceedings of the 10th International Conference on Extending Database Technology (EDBT 2006),Munich, Germany, Mar. 2006, pp. 1-18.
Demichiel, et al., JSR 220: Enterprise JavaBeans™, EJB 3.0 Simplified API, EJB 3.0 Expert Group, Sun Microsystems, Ver. 3.0, May 2, 2006, 59 pages.
Deshpande, et al., Adaptive Query Processing, Slide show believed to be prior to Oct. 17, 2007, 27 pages.
Diao, et al., Query Processing for High-Volume XML Message Brokering, Proceedings of the 29th VLDB Conference, Berlin, Germany, 2003, 12 pages.

(56) References Cited

OTHER PUBLICATIONS

Diao, Query Processing for Large-Scale XML Message Brokering, University of California Berkeley, 2005, 226 pages.
Dindar, et al., Event Processing Support for Cross-Reality Environments, Pervasive Computing, IEEE CS, Jul.-Sep. 2009, Copyright 2009, IEEE, Jul.-Sep. 2009, pp. 2-9.
Fernandez, et al., Build your own XQuery processor, slide show, at URL: http://www.galaxquery.org/slides/edbt-summer-school2004.pdf, 2004, 116 pages.
Fernandez, et al., Implementing XQuery 1.0: The Galax Experience, Proceedings of the 29th VLDB Conference, Berlin, Germany, 2003, 4 pages.
Florescu, et al., The BEA/XQRL Streaming XQuery Processor, Proceedings of the 29th VLDB Conference, 2003, 12 pages.
Gilani, Design and implementation of stream operators, query instantiator and stream buffer manager, Dec. 2003, 137 pages.
Golab, et al., Issues in Data Stream Management, ACM SIGMOD Record, vol. 32, issue 2, ACM Press, Jun. 2003, pp. 5-14.
Golab, et al., Sliding Window Query Processing Over Data Streams, University of Waterloo, D Waterloo, Ont. Canada, Aug. 2006, 182 pages.
Gosling, et al., The Java Language Specification, Book, copyright, 3rd edition, FG, Sun Microsystems USA. D (due to size, reference will be uploaded in two parts), 1996-2005, 684 pages.
Hao, et al., Achieving high performance web applications by service and database replications at edge servers, Performance Computing and communications conference(IPCCC) IEEE 28th International, IEEE, Piscataway, NJ, USA, XP031622711, ISBN: 978-1-4244-5737-3, 2009, pp. 153-160.
Hopcroft, Introduction to Automata Theory, Languages, and Computation, Second Edition, Addison-Wesley, Copyright 2001, 524 pages.
Hulton, et al., Mining Time-Changing Data Stream, Proceedings of the Seventh ACM SIGKDD International Conference on Knowledge Discovery and Data Mining, Aug. 2001, 10 pages.
Jin, et al., ARGUS: Efficient Scalable Continuous Query Optimization for Large-Volume Data Streams, 10th International Database Engineering and Applications Symposium (IDEAS'06), 2006, 7 pages.
Kawaguchi, et al., Java Architecture for XML Binding (JAXB) 2.2, Sun Microsystems, Inc., Dec. 10, 1999, 384 pages.
Knuth, et al., Fast Pattern Matching in Strings, Siam J Comput 6(2), Jun. 1977, pp. 323-350.
Lakshmanan, et al., On efficient matching of streaming XML documents and queries, 2002, 18 pages.
Lindholm, et al., Java Virtual Machine Specification, 2nd Edition Prentice Hall, Apr. 1999, 484 pages.
Liu, et al., Efficient XSLT Processing in Relational Database System, Proceeding of the 32nd. International Conference on Very Large Data Bases (VLDB), Sep. 2006, pp. 1106-1116.
Luckham, What's the Difference Between ESP and CEP? Complex Event Processing, downloaded, at URL:http://complexevents.com/?p=103, Apr. 29, 2011, 5 pages.
Madden, et al., Continuously Adaptive Continuous Queries (CACQ) over Streams, SIGMOD, Jun. 4-6, 2002, 12 pages.
Martin, et al., Finding Application Errors and Security Flaws Using PQL, a Program Query Language, OOPSLA'05, Oct. 16, 2005, pp. 1-19.
Babcock, et al., Models and Issues in Data Streams, Proceedings of the 21st ACM SIGMOD-SIGACT-SIDART symposium on Principles of database systems, 2002, 30 pages.
Motwani, et al., Query Processing Resource Management, and Approximation in a Data 0 Stream Management System, Proceedings of CIDR, Jan. 2003, 12 pages.
Munagala, et al., Optimization of Continuous Queries with Shared Expensive Filters, Proceedings of the 26th ACM SIGMOD-SIGACT-SIGART symposium on Principles of database systems, Oct. 17, 2007, 14 pages.
Nah, et al., A Cluster-Based TMO-Structured Scalable Approach for Location Information Systems, Object-Oriented Real-Time Dependable Systems, 2003. WORDS 2003 Fall. Proceedings. Ninth IEEE International Workshop on Date of Conference: Oct. 1-3, 2003, pp. 225-233.
Novick, Creating a User Defined Aggregate with SQL Server 2005, URL: http://novicksoftware.com/Articles/sql-2005-product-user-defined-aggregate.html, 2005, 6 pages.
International Application No. PCT/US2011/052019, International Search Report and Written Opinion dated Nov. 17, 2011, 55 pages.
International Application No. PCT/US2012/034970, International Search Report and Written Opinion dated Jul. 16, 2012, 13 pages.
International Application No. PCT/US2012/036353, International Search Report and Written Opinion dated Sep. 12, 2012, 11 pages.
Peng, et al., Xpath Queries on Streaming Data, 2003, pp. 1-12.
Peterson, Petri Net Theory and the Modeling of Systems, Prentice Hall, 1981, 301 pages.
PostgresSQL, Manuals: PostgresSQL 8.2: Create Aggregate, believed to be prior to Apr. 21, 2007, 4 pages.
PostgresSQL, Documentation: Manuals: PostgresSQL 8.2: User-Defined Aggregates believed to be prior to Apr. 21, 2007, 4 pages.
Sadri, et al., Expressing and Optimizing Sequence Queries in Database Systems, ACM Transactions on Database Systems, vol. 29, No. 2, ACM Press, Copyright, Jun. 2004, pp. 282-318.
Sadtler, et al., WebSphere Application Server Installation Problem Determination, Copyright 2007, IBM Corp., 2007, pp. 1-48.
Sansoterra, Empower SQL with Java User-Defined Functions, ITJungle.com, Oct. 9, 2003, 9 pages.
Sharaf, et al., Efficient Scheduling of Heterogeneous Continuous Queries, VLDB, Sep. 12-15, 2006, pp. 511-522.
Stolze, et al., User-defined Aggregate Functions in DB2 Universal Database, Retrievd from: <http://www.128.ibm.com/develOperworks/d b2/1 ibrary/tachartic1e/0309stolze/0309stolze.html>, Sep. 11, 2003, 11 pages.
Stump, et al., Proceedings, The 2006 Federated Logic Conference, IJCAR '06 Workshop, PLPV '06: Programming Languages meets Program Verification, 2006, pp. 1-113.
Terry, et al., Continuous queries over append-only database, Proceedings of ACM SIGMOD, 1992, pp. 321-330.
Ullman, et al., Introduction to JDBC, Stanford University, 2005, 7 pages.
Vajjhala, et al., The Java Architecture for XML Binding (JAXB) 2.0, Sun Microsystem, D Inc., Final Release , Apr. 19, 2006, 384 pages.
Vijayalakshmi, et al., Processing location dependent continuous queries in distributed mobile databases using mobile agents, IET-UK International Conference on Information and Communication Technology in Electrical Sciences (ICTES 2007), Dec. 22, 2007, pp. 1023-1030.
W3C, XML Path Language (Xpath), W3C Recommendation, Version. 1.0, Retrieved from: URL: http://www.w3.org/TR/xpath, Nov. 16, 1999, 37 pages.
Wang, et al., Distributed continuous range query processing on moving objects, DEXA'06 Proceedings of the 17th international conference on Database and Expert Systems Applications, 2006, pp. 655-665.
White, et al., WebLogic Event Server: A Lightweight, Modular Application Server for Event Processing, 2nd International Conference on Distributed Event-Based Systems, Rome, Italy, Copyright 2004., Jul. 2-4, 2008, 8 pages.
Widom, et al., CQL: A Language for Continuous Queries over Streams and Relations, Oct. 17, 2007, 62 pages.
Widom, et al., The Stanford Data Stream Management System, PowerPoint Presentation, Oct. 17, 2007, 110 pages.
Wu, et al., Dynamic Data Management for Location Based Services in Mobile Environments, Database Engineering and Applications Symposium, Jul. 16, 2003, pp. 172-181.
Zemke, XML Query, mailed on Mar. 14, 2004, 29 pages.
U.S. Appl. No. 13/838,259, filed Mar. 15, 2013, Deshmukh et al.
U.S. Appl. No. 13/839,288, filed Mar. 15, 2013, Deshmukh et al.
Call User Defined Functions from Pig, Amazon Elastic MapReduce, Mar. 2009, 2 pages.
Strings in C, retrieved from the internet: <URL: https://web.archive.org/web/20070612231205/http:l/web.cs.swarthmore.edu/-newhall/unixhelp/C_strings.html> [retrieved on May 13, 2014], Swarthmore College, Jun. 12, 2007, 3 pages.

(56) References Cited

OTHER PUBLICATIONS

U.S. Appl. No. 11/874,197, Notice of Allowance dated Jun. 22, 2012, 20 pages.
U.S. Appl. No. 12/396,464, Final Office Action dated on May 16, 2014, 16 pages.
U.S. Appl. No. 12/548,187, Final Office Action dated Jun. 4, 2014, 64 pages.
U.S. Appl. No. 13/089,556, Final Office Action dated Jun. 13, 2014, 14 pages.
U.S. Appl. No. 13/107,742, Non-Final Office Action dated Jun. 19, 2014, 20 pages.
U.S. Appl. No. 13/244,272, Notice of Allowance dated Aug. 12, 2013, 12 pages.
International Application No. PCT/US2011/052019, International Preliminary Report on Patentability dated Mar. 28, 2013, 6 pages.
International Application No. PCT/US2012/034970, International Preliminary Report on Patentability dated Nov. 21, 2013, 7 pages.
International Application No. PCT/US2012/036353, International Preliminary Report on Patentability dated Nov. 28, 2013, 6 pages.
Bottom-up parsing, Wikipedia, downloaded from: http://en.wikipedia.org/wiki/Bottom-up_parsing, Sep. 8, 2014, pp. 1-2.
Branch Predication, Wikipedia, downloaded from: http://en.wikipedia.org/wiki/Branch_predication, Sep. 8, 2014, pp. 1-4.
Microsoft Computer Dictionary, 5th Edition, Microsoft Press, Redmond, WA, 2002, pp. 238-239 and 529.
Notice of Allowance for U.S. Appl. No. 13/089,556 dated Oct. 6, 2014, 9 pages.
U.S. Appl. No. 12/396,464, Notice of Allowance dated Sep. 3, 2014, 7 pages.
U.S. Appl. No. 12/548,187, Advisory Action dated Sep. 26, 2014, 6 pages.
U.S. Appl. No. 12/548,281, Final Office Action dated Aug. 13, 2014, 19 pages.
U.S. Appl. No. 12/913,636, Non-Final Office Action dated Jul. 24, 2014, 22 pages.
U.S. Appl. No. 12/957,201, Non-Final Office Action dated Jul. 30, 2014, 12 pages.
U.S. Appl. No. 13/764,560, Non-Final Office Action dated Sep. 12, 2014, 23 pages.
U.S. Appl. No. 13/770,969, Non-Final Office Action dated Aug. 7, 2014, 9 pages.
U.S. Appl. No. 14/302,031, Non-Final Office Action dated Aug. 27, 2014, 19 pages.
Abadi et al., Aurora: a new model and architecture for data stream management, The VLDB Journal the International Journal on Very Large Data Bases, vol. 12, No. 2, Aug. 1, 2003, pp. 120-139.
Balkesen et al., Scalable Data Partitioning Techniques for Parallel Sliding Window Processing over Data Streams, 8th International Workshop on Data Management for Sensor Networks, Aug. 29, 2011, pp. 1-6.
Chandrasekaran et al., PSoup: a system for streaming queries over streaming data, The VLDB Journal, The International Journal on Very Large Data Bases, vol. 12, No. 2, Aug. 1, 2003, pp. 140-156.
Dewson, Beginning SQL Server 2008 for Developers: From Novice to Professional, A Press, Berkeley, CA, 2008, pp. 337-349 and 418-438.
Harish D et al., Identifying robust plans through plan diagram reduction, PVLDB '08, Auckland, New Zealand, Aug. 23-28, pp. 1124-1140.
Krämer, Continuous Queries Over Data Streams—Semantics and Implementation, Fachbereich Mathematik und Informatik der Philipps-Universitat, Marburg, Germany, Retrieved from the Internet: URL:http://archiv.ub.uni-marburg.de/dissjz007/0671/pdfjdjk.pdf, Jan. 1, 2007; 313 pages.
International Application No. PCT/US2013/062047, International Search Report and Written Opinion dated Jul. 16, 2014, 12 pages.
International Application No. PCT/US2013/062050, International Search Report & Written Opinion dated Jul. 2, 2014, 13 pages.
International Application No. PCT/US2013/062052, International Search Report & Written Opinion dated Jul. 3, 2014, 12 pages.
International Application No. PCT/US2013/073086, International Search Report and Written Opinion dated Mar. 14, 2014.
International Application No. PCT/US2014/017061, International Search Report and Written Opinion dated Sep. 9, 2014, 12 pages.
Rao et al., Compiled Query Execution Engine using JVM, ICDE '06, Atlanta, GA, Apr. 3-7, 2006, 12 pages.
Ray et al., Optimizing complex sequence pattern extraction using caching, data engineering workshops (ICDEW)~ 2011 IEEE 27th international conference on IEEE, Apr. 11, 2011, pp. 243-248.
Shah et al., Flux: an adaptive partitioning operator for continuous query systems, Proceedings of the 19th International Conference on Data Engineering, Mar. 5-8, 2003, pp. 25-36.
Stillger et al., LEO—DB2's LEarning Optimizer, Proc. of the VLDB, Roma, Italy, Sep. 2001, pp. 19-28.
U.S. Appl. No. 12/548,281, Non-Final Office Action dated Feb. 13, 2014, 16 pages.
U.S. Appl. No. 13/177,748, Final Office Action dated Mar. 20, 2014, 23 pages.
PCT Patent Application No. PCT/US2014/010832, International Search Report dated Apr. 3, 2014, 9 pages.
Cadonna et al., Efficient event pattern matching with match windows, Proceedings of the $18^{th}$ ACM SIGKDD international conference on knowledge discovery and data mining (Aug. 2012), pp. 471-479.
Nichols et al., A faster closure algorithm for pattern matching in partial-order event data, IEEE International Conference on Parallel and Distributed Systems (Dec. 2007), pp. 1-9.
Oracle™ Fusion Middleware CQL Language Reference, 11g Release 1 (11.1.1.6.3) E12048-10, Aug. 2012, pp. 6-1 to 6-12.
Oracle™ Complex Event Processing CQL Language Reference, 11g Release 1 (11.1.1.4.0) E12048-04, Jan. 2011, pp. 6.1 to 6.12.
Oracle™ Complex Event Processing CQL Language Reference, 11g Release 1 (11.1.1) E12048-03, Apr. 2010, sections 18-4 to 18.4.2.
Pattern Recognition With MATCH_RECOGNIZE, Oracle™ Complex Event Processing CQL Language Reference, 11g Release 1 (11.1.1) E12048-03, May 2009, pp. 15.1 to 15.20.
Supply Chain Event Management: Real-Time Supply Chain Event Management, product information Manhattan Associates, 2009-2012.
What is BPM?, Datasheet [online]. IBM, [retrieved on Jan. 28, 2013]. Retrieved from the Internet: <URL: http://www-01.ibm.com/software/info/bpm/whatis-bpm/>.
U.S. Appl. No. 11/601,415, Non-Final Office Action dated Dec. 11, 2013, 58 pages.
U.S. Appl. No. 12/396,464, Non Final Office Action dated Dec. 31, 2013, 16 pages.
U.S. Appl. No. 12/548,281, Final Office Action dated Oct. 10, 2013, 21 pages.
U.S. Appl. No. 12/548,290, Notice of Allowance dated Sep. 11, 2013, 6 pages.
U.S. Appl. No. 12/949,081, Final Office Action dated Aug. 27, 2013, 13 pages.
U.S. Appl. No. 13/089,556, Final Office Action dated Aug. 29, 2013, 10 pages.
U.S. Appl. No. 13/089,556, Non-Final Office Action dated Jan. 9, 2014, 14 pages.
U.S. Appl. No. 13/177,748, Non-Final Office Action dated Aug. 30, 2013, 24 pages.
U.S. Appl. No. 13/193,377, Notice of Allowance dated Aug. 30, 2013, 19 pages.
Non-Final Office Action for U.S. Appl. No. 12/548,187 dated Feb. 6, 2014, 53 pages.
Agrawal et al. "Efficient pattern matching over event streams," Proceedings of the 2008 ACM SIGMOD international conference on Management of data, pp. 147-160 (Jun. 2008).
Chandramouli et al., High-Performance Dynamic Pattern Matching over Disordered Streams, Proceedings of the VLDB Endowment, vol. 3, Issue 1-2, Sep. 2010, pp. 220-231.
Chapple "Combining Query Results with the UNION Command," ask.com Computing Databases, downloaded from: http://databases.about.com/od/sql/a/union.htm (no date, printed on Oct. 14, 2013).

(56) References Cited

OTHER PUBLICATIONS

Chui, WebSphere Application Server V6.1—Class loader problem determination, IBM.com, 2007.
Fantozzi, A Strategic Approach to Supply Chain Event Management, student submission for Masters Degree, Massachusetts Institute of Technology, Jun. 2003.
Komazec et al., Towards Efficient Schema-Enhanced Pattern Matching over RDF Data Streams, Proceedings of the 1st International Workshop on Ordering and Reasoning (OrdRing 2011), Bonn, Germany, Oct. 2011.
Ogrodnek, Custom UDFs and hive, Bizo development blog http://dev.bizo.com, Jun. 23, 2009, 2 pp.
Pradhan, Implementing and Configuring SAP® Event Management, Galileo Press, 2010, pp. 17-21.
Wilson et al., SAP Event Management, an Overview, Q Data USA, Inc., 2009.
Cranor et al. "Gigascope: a stream database for network applications," Proceedings of the 2003 ACM SIGMOD international conference on Management of data, pp. 647-651 (Jun. 2003).
Oracle® Complex Event Processing EPL Language Reference 11g Release 1 (11.1.1.4.0), E14304-02, Jan. 2011, 80 pages.
De Castro Alves, A General Extension System for Event Processing Languages, DEBS '11, New York, NY, USA, Jul. 11-15, 2011, pp. 1-9.
Takenaka et al., A scalable complex event processing framework for combination of SQL-based continuous queries and C/C++ functions, FPL 2012, Oslo, Norway, Aug. 29-31, 2012, pp. 237-242.
Tomàs et al., RoSeS: A Continuous Content-Based Query Engine for RSS Feeds, DEXA 2011, Toulouse, France, Sep. 2, 2011, pp. 203-218.
Non-Final Office Action for U.S. Appl. No. 13/830,378 dated Feb. 25, 2015, 23 pages.
Non-Final Office Action for U.S. Appl. No. 13/830,129 dated Feb. 27, 2015, 19 pages.
International Application No. PCT/US2014/068641, International Search Report and Written Opinion dated Feb. 26, 2015, 11 pages.
European Patent Application No. 12783063.6, Extended Search Report dated Mar. 24, 2015, 6 pages.
Non-Final Office Action for U.S. Appl. No. 12/913,636 dated Apr. 1, 2015, 22 pages.
Final Office Action for U.S. Appl. No. 13/827,631 dated Apr. 3, 2015, 11 pages.
Notice of Allowance for U.S. Appl. No. 13/839,288 dated Apr. 3, 2015, 12 pages.
Notice of Allowance for U.S. Appl. No. 14/077,230 dated Apr. 16, 2015, 16 pages.
Final Office Action for U.S. Appl. No. 13/764,560 dated Apr. 15, 2015, 19 pages.
U.S. Appl. No. 12/949,081, Non-Final Office Action dated Jan. 28, 2015, 20 pages.
U.S. Appl. No. 12/957,201, Notice of Allowance dated Jan. 21, 2015, 5 pages.
U.S. Appl. No. 13/107,742, Final Office Action dated Jan. 21, 2015, 23 pages.
U.S. Appl. No. 13/177,748, Non-Final Office Action dated Feb. 3, 2015, 22 pages.
U.S. Appl. No. 13/770,961, Non-Final Office Action dated Feb. 4, 2015, 22 pages.
U.S. Appl. No. 13/770,969, Notice of Allowance dated Jan. 22, 2015, 5 pages.
U.S. Appl. No. 13/829,958, Non-Final Office Action dated Dec. 11, 2014, 15 pages.
U.S. Appl. No. 13/839,288, Non-Final Office Action dated Dec. 4, 2014, 30 pages.
U.S. Appl. No. 13/906,162, Non-Final Office Action dated Dec. 29, 2014, 10 pages.
U.S. Appl. No. PCT/US2014/010832, Written Opinion dated Dec. 15, 2014, 5 pages.
International Application No. PCT/US2014/010920, International Search Report and Written Opinion dated Dec. 15, 2014, 10 pages.
International Application No. PCT/US2014/017061, Written Opinion dated Feb. 3, 2015, 6 pages.
International Application No. PCT/US2014/039771, International Search Report and Written Opinion dated Sep. 24, 2014, 12 pages.
Tho et al. "Zero-latency data warehousing for heterogeneous data sources and continuous data streams," 5th International Conference on Information Integrationand Web-based Applications Services (Sep. 2003) 12 pages.
Non-Final Office Action for U.S. Appl. No. 13/838,259 dated Oct. 24, 2014, 21 pages.
Notice of Allowance for U.S. Appl. No. 13/102,665 dated Nov. 24, 2014, 9 pages.
Non-Final Office Action for U.S. Appl. No. 13/827,631 dated Nov. 13, 2014, 10 pages.
Non-Final Office Action for U.S. Appl. No. 13/827,987 dated Nov. 6, 2014, 9 pages.
Non-Final Office Action for U.S. Appl. No. 11/601,415 dated Oct. 6, 2014, 18 pages.
Non-Final Office Action for U.S. Appl. No. 14/077,230 dated Dec. 4, 2014, 30 pages.
Non-Final Office Action for U.S. Appl. No. 13/828,640 dated Dec. 2, 2014, 11 pages.
Non-Final Office Action for U.S. Appl. No. 13/830,428 dated Dec. 5, 2014, 23 pages.
Notice of Allowance for U.S. Appl. No. 12/548,187 dated Aug. 17, 2015, 18 pages.
Notice of Allowance for U.S. Appl. No. 13/107,742 dated Jul. 8, 2015, 9 pages.
Non-Final Office Actio for U.S. Appl. No. 14/037,072 dated Jul. 9, 2015, 12 pages.
Non-Final Office Action for U.S. Appl. No. 14/036,659 dated Aug. 13, 2015, 33 pages.
Oracle Complex Event Processing Exalogic Performance Study, http://www.oracle.com/technetwork!middleware/complex-event-processing/overview/cepexalogicwhitepaperfinal-498043.pdf, Sep. 2011, pp. 1-16.
"Data stream management system", Wikipedia, downloaded from en.wikipedia.org/wiki/Data_stream_management_system on Sep. 23, 2015, pp. 1-5.
Josifovsky, Vanja, et al., "Querying XML Streams", The VLDB Journal, vol. 14, © 2005, pp. 197-210.
Purvee, Edwin Ralph, "Optimizing SPARQLeR Using Short Circuit Evaluation of Filter Clauses", Master of Science Thesis, Univ. of Georgia, Athens, GA, © 2009, 66 pages.
Weidong, Yang, et al., "LeoXSS: An Efficient XML Stream System for Processing Complex XPaths", CIT 2006, Seoul, Korea, © 2006, 6 pages.
Japan Patent Office office actions JPO patent application JP2013-529376 (dated Aug. 18, 2015).
Final Office Action for U.S. Appl. No. 13/177,748 dated Aug. 21, 2015, 24 pages.
Non-Final Office Action for U.S. Appl. No. 14/036,500 dated Aug. 14, 2015, 26 pages.
Notice of Allowance for U.S. Appl. No. 13/830,129 dated Sep. 22, 2015, 9 pages.
Final Office Action for U.S. Appl. No. 13/770,961 dated Aug. 31, 2015, 28 pages.
Non-Final Office Action for U.S. Appl. No. 13/764,560 dated Oct. 6, 2015, 18 pages.
Non-Final Office Action for U.S. Appl. No. 14/621,098 dated Oct. 15, 2015, 21 pages.
Notice of Allowance for U.S. Appl. No. 14/692,674 dated Oct. 15, 2015, 10 pages.
Notice of Allowance for U.S. Appl. No. 14/037,171 dated Oct. 15, 2015, 14 pages.
Final Office Action for U.S. Appl. No. 14/302,031 dated Apr. 22, 2015, 23 pages.
Non-Final Office Action for U.S. Appl. No. 14/692,674 dated Jun. 5, 2015, 22 pages.
Non-Final Office Action for U.S. Appl. No. 14/037,171 dated Jun. 3, 2015, 15 pages.
Non-Final Office Action for U.S. Appl. No. 14/830,735 dated May 26, 2015, 19 pages.

(56) References Cited

OTHER PUBLICATIONS

Final Office Action for U.S. Appl. No. 13/830,428 dated Jun. 4, 2015, 21 pages.
Non-Final Office Action for U.S. Appl. No. 14/838,259 dated Jun. 9, 2015, 37 pages.
Final Office Action for U.S. Appl. No. 14/906,162 dated Jun. 10, 2015, 10 pages.
Non-Final Office Action for U.S. Appl. No. 14/037,153 dated Jun. 19, 2015, 23 pages.
Final Office Action for U.S. Appl. No. 13/829,958 dated Jun. 19, 2015, 17 pages.
Final Office Action for U.S. Appl. No. 13/827,987 dated Jun. 19, 2015, 10 pages.
International Application No. PCT/US2014/039771, International Search Report and Written Opinion dated Apr. 29, 2015 6 pages.
International Application No. PCT/US2015/016346, International Search Report and Written Opinion dated May 4, 2015, 9 pages.
International Preliminary Report on Patentability dated Apr. 9, 2015 for PCT/US2013/062047, 10 pages.
International Preliminary Report on Patentability dated Apr. 9, 2015 for PCT/US2013/062052, 18 pages.
International Preliminary Report on Patentability dated May 28, 2015 for PCT/US2014/017061, 31 pages.
International Preliminary Report on Patentability dated Jun. 18, 2015 for PCT/US2013/073086, 7 pages.
International Preliminary Report on Patentability dated Jul. 29, 2015 for PCT/US2014/010920, 30 pages.
International Preliminary Report on Patentability dated Jul. 29, 2015 for PCT/US2014/039771, 24 pages.
China Patent Office office actions for patent application CN201280022008.7 (dated Dec. 3, 2015).
European Application No. 12783063.6, Office Action dated Nov. 11, 2015, 8 pages.
Notice of Allowance for U.S. Appl. No. 12/548,187, dated Feb. 2, 2016, 15 pages.
Notice of Allowance for U.S. Appl. No. 14/037,072 dated Feb. 16, 2016, 17 pages.
Final Office Action for U.S. Appl. No. 13/830,735 dated Dec. 21, 2015, 20 pages.
Notice of Allowance for U.S. Appl. No. 13/827,987 dated Jan. 4, 2016, 16 pages.
Notice of Allowance for U.S. Appl. No. 13/177,748 dated Jan. 6, 2016, 9 pages.
Notice of Allowance for U.S. Appl. No. 13/828,640 dated Jan. 6, 2016, 16 pages.
Non-Final Office Action for U.S. Appl. No. 13/830,428 dated Jan. 15, 2016, 25 pages.
Final Office Action for U.S. Appl. No. 14/037,153 dated Jan. 21, 2016, 31 pages.
Non-Final Office Action for U.S. Appl. No. 13/829,958 dated Feb. 1, 2016, 20 pages.
Non-Final Office Action for U.S. Appl. No. 13/827,631 dated Feb. 11, 2016, 12 pages.
Ghazal et al., Dynamic plan generation for parameterized queries, Jul. 2009, 7 pages.
Chaudhuri et al., Variance aware optimization of parameterized queries, Jun. 2010, 12 pages.
Seshadri et al., SmartCQL: Semantics to Handle Complex Queries over Data Streams, 2010, 5 pages.
International Search Report and Written Opinion dated Dec. 15, 2015 for PCT/US2015/051268, 17 pages.
"11 Oracle Event Processing NoSQL 1-20 Database Data Cartridge-11g Release 1 (11.1.1.7) 11," Oracle Fusion Middleware CQL Language Reference for Oracle Event Processing 11g Release 1 (11.1.1.7), 4 pages (Sep. 25, 2013).
Oracle Event Processing Hadoop Data Cartridge-11g Release 1(11.1.1.7), Oracle Fusion Middleware CQL LanguageReference for Oracle Event Processing 11g Release 1 (11.1.1.7) 4 pages (Sep. 25, 2013).
Liu "Hbase Con 2014: HBase Design Patterns @Yahoo!" (May 5, 2014), 20 pages.
Hasan et al. "Towards unified and native enrichment in event processing systems," Proceedings of the 7th ACM international conference on Distributed event-based systems, pp. 171-182 (Jun. 29, 2013).
Katsov "In-Stream Big Data Processing : Highly Scalable Blog" 20 pages (Aug. 20, 2013).
Katsov "In-Stream Big Data Processing : Highly Scalable Blog" 19 pages (Aug. 29, 2014).
Final Office Action for U.S. Appl. No. 13/830,759 dated Feb. 18, 2016, 18 pages.
Notice of Allowance for U.S. Appl. No. 13/770,961 dated Apr. 4, 2016, 8 pages.
Final Office Action for U.S. Appl. No. 13/838,259 dated Feb. 19, 2016, 47 pages.
Notice of Allowance for U.S. Appl. No. 13/906,162 dated Apr. 5, 2016, 7 pages.
Final Office Action for U.S. Appl. No. 14/036,500 dated Mar. 17, 2016, 34 pages.
Final Office Action for U.S. Appl. No. 13/764,560 dated Apr. 14, 2016, 20 pages.
Final Office Action for U.S. Appl. No. 14/621,098 dated Apr. 21, 2016, 16 pages.
Hirzel et al., "SPL Stream Processing Language Report", IBM Research Report RC24897 (W0911-044), IBM Research Division, Thomas J. Watson Research center, Yorktown Heights, NY, Nov. 5, 2009, 19 pages.
Japan Patent Office office actions JPO patent application JP2014-509315 (dated Mar. 15, 2016).
Watanabe et al., Development of a Data Stream Integration System with a Multiple Query Optimizer, Journal articles of the 15th Data Engineering Workshop (DEWS2004), The Institute of Electronics, Information and Communication Engineers, Technical Committee on Data Engineering, Aug. 11, 2009, pp. 1-8.
Kuwata et al., Stream Data Analysis Application for Customer Behavior with Complex Event Processing, IEICE Technical Report, The Institute of Electronics, Information and Communication Engineers, Jun. 21, 2010, vol. 110, No. 107, pp. 13-18.
Kitagawa et al., Sensing Network, Information Processing, Information Processing Society of Japan, Sep. 15, 2010, vol. 51, No. 9, pp. 1119-1126.
Non-Final Office Action for U.S. Appl. No. 14/079,538 dated Oct. 22, 2015, 34 pages.
Non-Final Office Action for U.S. Appl. No. 13/906,162 dated Oct. 28, 2015, 11 pages.
Notice of Allowance for U.S. Appl. No. 14/302,031 dated Nov. 3, 2015, 18 pages.
Final Office Action for U.S. Appl. No. 12/949,081 dated Nov. 17, 2015, 19 pages.
China Patent Office office actions for patent application CN201180053021.4 (dated Oct. 28, 2015).
Notice of Allowance for U.S. Appl. No. 12/913,636 dated Oct. 27, 2015, 22 pages.
Final Office Action for U.S. Appl. No. 13/830,378 dated Nov. 5, 2015, 28 pages.
Non-Final Office Action for U.S. Appl. No. 11/601,415 dated Nov. 13, 2015, 18 pages.
Map Reduce, Wikipedia, The Free Encyclopedia, 2016, 11 pages.
Pig (programming tool), Wikipedia, The Free Encyclopedia, 2016, 4 pages.
U.S. Appl. No. 13/764,560, Notice of Allowance dated Sep. 30, 2016, 10 pages.
U.S. Appl. No. 14/079,538, Final Office Action dated Jul. 27, 2016, 28 pages.
U.S. Appl. No. 14/883,815, Notice of Allowance dated Aug. 30, 2016, 13 pages.
U.S. Appl. No. 13/827,631, Final Office Action dated Oct. 20, 2016, 12 pages.
Mahlke et al., Comparison of Full and Partial Predicated Execution Support for ILP Processors, ICSA '95, Santa Margherita Ligure, 1995, pp. 138-149.

(56) References Cited

OTHER PUBLICATIONS

Olston et al., Pig Latin, A Not-So-Foreign Language for Data Processing, 2008, 12 pages.
International Application No. PCT/US2015/016346, International Preliminary Report on Patentability dated Sep. 30, 2016, 6 pages.
International Application No. PCT/US2015/051268, Written Opinion dated Aug. 18, 2016, 7 pages.
Yang et al., Map-Reduce-Merge, Simplified Relational Data Processing on Large Clusters, 2007, 12 pages.
U.S. Appl. No. 13/828,640 Final Office Action, dated Jun. 17, 2015, 11 pages.
U.S. Appl. No. 13/829,958 Non-Final Office Action, dated Dec. 27, 2016, 20 pages.
U.S. Appl. No. 13/838,259 Non-Final Office Action, dated Jan. 4, 2017, 65 pages.
U.S. Appl. No. 14/610,971 Non-Final Office Action, dated Dec. 19, 2016, 10 pages.
U.S. Appl. No. 14/621,098 Non-Final Office Action, dated Nov. 14, 2016.
U.S. Appl. No. 15/015,933 Non-Final Office Action, dated Jan. 30, 2017, 11 pages.
U.S. Appl. No. 14/559,550 Non-Final Office Action, dated Jan. 27, 2017, 16 pages.
U.S. Appl. No. 15/003,646 Non-Final Office Action, dated Dec. 2, 2016, 9 pages.
U.S. Appl. No. 15/015,933, Non-Final Office Action dated Jan. 30, 2017, 11 pages.
U.S. Appl. No. 13/830,759, Non-Final Office Action dated Feb. 10, 2017, 23 pages.
U.S. Appl. No. 13/827,631, Non-Final Office Action dated Feb. 16, 2017, 16 pages.
International Application No. PCT/US2015/051268 International Preliminary Report on Patentability dated Dec. 8, 2016, 12 pages.
Bestehorn Fault-tolerant query processing in structured P2P-systems, Springer Science+Business Media LLC Distrib Parallel Databases 28:33-66 (May 8, 2010).
Cooperativesystems: "Combined WLAN and Inertial Indoor Pedestrian Positioning System" URL:https://www.youtube.com/watch?v=mEt88WaHZvU.
Frank et al "Development and Evaluation of a Combined WLAN & Inertial Indoor Pedestrian Positioning System" Proceedings of the 22$^{nd}$ International Technical Meeting of the Satellite Division of the Institute of Navigation (ION GNSS 2009). (Sep. 25, 2009) pp. 538-546.
Kramer " Semantics and Implementation of Continuous Sliding Window Queries over Data Streams" ACM Transactions on Database Systems, vol. 34, pp. 4:1 to 4:49 (Apr. 2009).
Final Office Action for U.S. Appl. No. 13/830,428 dated May 26, 2016, 26 pages.
Final Office Action for U.S. Appl. No. 11/601,415 dated May 17, 2016, 17 pages.
Final Office Action for U.S. Appl. No. 14/036,659 dated Apr. 22, 2016, 38 pages.
Non-Final Office Action for U.S. Appl. No. 14/883,815 dated May 10, 2016, 32 pages.
Notice of Allowance for U.S. Appl. No. 12/949,081 dated May 3, 2016, 6 pages.
Final Office Action for U.S. Appl. No. 13/829,958 dated Jun. 30, 2016, 19 pages.
Final Office Action for U.S. Appl. No. 13/830,502 dated Jul. 6, 2016, 28 pages.
International Preliminary Report on Patentabiilty dated Jun. 16, 2016 for PCT/US2014/068641, 7 pages.
International Application No. PCT/RU2015/000468, International Search Report and Written Opinion dated Apr. 25, 2016, 9 pages.
International Application No. PCT/US2015/016346, International Search Report and Written Opinion dated May 24, 2016, 5 pages.
China Patent Office office action for patent application CN201180053021.4 (dated May 27, 2016).
U.S. Appl. No. 13/829,958, Final Office Action dated Jun. 26, 2017, 22 pages.
U.S. Appl. No. 13/830,378, Non-Final Office Action dated Jul. 5, 2017, 44 pages.
U.S. Appl. No. 13/838,259, Final Office Action dated Jul. 7, 2017, 69 pages.
U.S. Appl. No. 14/036,500, Notice of Allowance dated Jun. 30, 2017, 14 pages.
U.S. Appl. No. 14/036,559, Non-Final Office Action dated Jun. 2, 2017, 28 pages.
U.S. Appl. No. 14/559,550, Final Office Action dated Jul. 12, 2017, 21 pages.
U.S. Appl. No. 14/621,098, Notice of Allowance dated May 3, 2017, 9 pages.
U.S. Appl. No. 14/755,088, Non-Final Office Action dated Jun. 14, 2017, 13 pages.
U.S. Appl. No. 15/003,646, Notice of Allowance dated May 19, 2017, 16 pages.
U.S. Appl. No. 15/015,933, Notice of Allowance dated May 17, 2017, 16 pages.
U.S. Appl. No. 15/360,650, Notice of Allowance dated Jul. 24, 2017, 13 pages.
Akama et al., Design and Evaluation of a Data Management System for WORM Data Processing, Journal of Information Processing, Information Processing Society of Japan, vol. 49, No. 2, Feb. 15, 2008, pp. 749-764.
Chinese Application No. 201380056012.X, Office Action dated Jun. 1, 2017, 22 pages (10 pages for the original document and 12 pages For the English translation).
Japanese Application No. 2015-534676, Office Action dated Jun. 27, 2017, 9 pages.
Sadana "Interactive Scatterplot for Tablets," The 12th International Working Conference on Advanced Visual Interfaces, available from https://vimeo.com/97798460 (May 2014).
U.S. Appl. No. 13/830,428, Non-Final Office Action dated Mar. 22, 2017, 25 pages.
U.S. Appl. No. 14/036,500, Non-Final Office Action dated Feb. 9, 2017, 34 pages.
U.S. Appl. No. 14/079,538, Non-Final Office Action dated Mar. 31, 2017, 24 pages.
U.S. Appl. No. 15/360,650, Non-Final Office Action dated Mar. 9, 2017, 34 pages.
U.S. Appl. No. 13/830,735, Non-Final Office Action dated Apr. 4, 2017, 16 pages.
U.S. Appl. No. 15/177,147, Non-Final Office Action dated Apr. 7, 2017, 12 pages.
U.S. Appl. No. 14/866,512, Non-Final Office Action dated Apr. 10, 2017, 24 pages.
U.S. Appl. No. 14/610,971, Notice of Allowance dated Apr. 12, 2017, 11 pages.
China Patent Application No. CN201480030482.3, Office Action dated Feb. 4, 2017, 5 pages.
U.S. Appl. No. 13/827,631, Final Office Action dated Aug. 30, 2017, 18 pages.
1 U.S. Appl. No. 13/830,428, Final Office Action dated Oct. 5, 2017, 33 pages.
U.S. Appl. No. 13/830,735, Final Office Action dated Sep. 29, 2017, 16 pages.
U.S. Appl. No. 13/830,759, Notice of Allowance dated Aug. 23, 2017, 14 pages.
U.S. Appl. No. 14/037,153, Non-Final Office Action dated Aug. 10, 2017, 45 pages.
U.S. Appl. No. 14/755,088, Notice of Allowance dated Oct. 11, 2017, 5 pages.
U.S. Appl. No. 14/861,687, Non-Final Office Action dated Oct. 11, 2017, 10 pages.
U.S. Appl. No. 14/866,512, Final Office Action dated Sep. 13, 2017, 25 pages.
U.S. Appl. No. 15/177,147, Non-Final Office Action dated Nov. 3, 2017, 6 pages.
Chinese Application No. 201380056017.2, Office Action dated Jul. 17, 2017, 25 pages (16 pages for the original document and 9 pages for the English translation).

(56) References Cited

OTHER PUBLICATIONS

Chinese Application No. 201380056099.0, Office Action dated Jul. 4, 2017, 26 pages (14 pages for the original document and 12 pages for the English translation).
Japanese Application No. 2015-534678, Office Action dated Aug. 29, 2017, 3 pages.
Japanese Application No. 2015-534680, Office Action dated Aug. 22, 2017, 10 pages.
European Patent Application EP14825489.9, Office Action dated Jul. 28, 2017, 7 pages.
U.S. Appl. No. 13/829,958, Non-Final Office Action dated Jan. 8, 2018, 22 pages.
U.S. Appl. No. 13/830,735, Notice of Allowance dated Jan. 26, 2018, 9 pages.
U.S. Appl. No. 13/838,259, Non-Final Office Action dated Nov. 27, 2017, 69 pages.
U.S. Appl. No. 14/036,659, Notice of Allowance dated Nov. 30, 2017, 13 pages.
U.S. Appl. No. 14/079,538, Final Office Action dated Nov. 16, 2017, 26 pages.
U.S. Appl. No. 14/559,550, Notice of Allowance dated Dec. 5, 2017, 6 pages.
U.S. Appl. No. 14/973,377, Non-Final Office Action dated Nov. 30, 2017, 17 pages.
U.S. Appl. No. 14/866,512, Notice of Allowance dated Feb. 15, 2018, 5 pages.
Chinese Application No. 201480004736.4, Office Action dated Nov. 29, 2017, 13 pages (7 pages of English translation and 6 pages Of Original document).
Japanese Application No. 2015-534676, Office Action dated Jan. 23, 2018, 9 pages.
Japanese Application No. 2015-552781, Office Action dated Nov. 21, 2017, 3 pages.
Japanese Application No. 2015-558217, Office Action dated Jan. 9, 2018, 3 pages.
Japanese Application No. 2015-552765, Office Action dated Dec. 5, 2017, 2 pages.
Chinese Application No. CN201380063379.4, Office Action dated Feb. 2, 2018 12 pages with translation..
International Patent Application PCT/RU2015/000468, International Preliminary Report on Patentability dated Feb. 8, 2018, 9 pages.
U.S. Appl. No. 13/827,631, Notice of Allowance dated Mar. 13, 2018, 10 pages.
U.S. Appl. No. 15/177,147, Notice of Allowance dated Mar. 22, 2018, 7 pages.
U.S. Appl. No. 13/830,428, Notice of Allowance dated Apr. 2, 2018, 9 pages.

* cited by examiner

MANAGING CONTINUOUS QUERIES IN THE PRESENCE OF SUBQUERIES

CROSS REFERENCES TO RELATED APPLICATIONS

The present application is a non-provisional of and claims the benefit and priority under 35 U.S.C. 119(e) of U.S. Provisional Application No. 61/707,641, filed Sep. 28, 2012, entitled "REAL-TIME BUSINESS EVENT ANALYSIS AND MONITORING", the entire contents of which are incorporated herein by reference for all purposes. This application is also related to U.S. application Ser. No. 13/830,735, filed on Mar. 14, 2013, entitled "MECHANISM TO CHAIN CONTINUOUS QUERIES," now U.S. Pat. No. 9,946,756, the entire contents of which is hereby incorporated by reference as if fully set forth herein, under 35 U.S.C. § 120.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's events processing needs.

BRIEF SUMMARY

Techniques for providing continuous queries in the presence of subqueries are provided. According to at least one example, a computing system may identify a continuous query that includes at least a subquery. In some cases, identifying the continuous query may include receiving the continuous query or generating the continuous query. The computing system may also process the subquery to obtain a logical plan. The computing system may also process the continuous query based at least in part on merging the continuous query plan with the logical plan to obtain a result (e.g., the query result). In some examples, the continuous query may be configured to process business event data of a stream, business event data of a relation associated with the stream, and/or business event data of a database. Additionally, in some aspects, the relation may be configured as an unordered, time-varying set of tuples associated with the a stream of business event data. Additionally, in some examples, the computing system may provide the result to a user interface of a user that provided the continuous query. The user interface may be configured to display real-time data based at least in part on the result. Additionally, in some examples, the continuous query may be dependent on a first result from the subquery. The subquery may be configured as a continuous subquery and may be included within a "from" clause or a "set" clause of the continuous query. the subquery may also be configured to obtain a set of first results over time, and less than all of the set of first results may be stored in memory and accessible for processing the continuous query to obtain the result. Further, in some cases, the computing system may also reprocess the subquery to obtain a second logical plan over time based at least in part on an indication that data associated with the subquery has changed.

According to at least one example, a computer-readable memory may store instructions that, when executed by one or more processors, may cause the one or more processors to receive a continuous query statement with at least one nested subquery statement from a user associated with business event data. Additionally, the instructions may also cause the one or more processors to process the at least one nested subquery statement to obtain at least a logical subquery plan corresponding to the business event data. The instructions may also cause the one or more processors to process the continuous query based at least in part on merging a continuous query plan with the logical subquery plan to obtain at least a second result corresponding to the business event data. In some examples, the nested subquery may include at least another subquery. The data associated with the logical subquery plan may be included in a dimension table upon which the continuous query depends. Additionally, in some examples, the instructions may cause the one or more processors to receive an exception when data of the dimension table changes. Further, the dimension table may be refreshed by re-processing the at least one nested subquery statement based at least in part on the exception.

According to at least one example, a computer-implemented method may include receiving a continuous query statement from a user associated with business event data. The method may also include determining whether the continuous query includes one or more continuous subqueries. In some examples, when the method determines that the continuous query includes one or more subqueries, the method may include processing the continuous subquery to obtain a set of first results based at least in part on implementing a clause of the continuous subquery on a stream associated with the business event data of the user and processing the continuous query by utilizing at least a subset of the set of first results to obtain second results based at least in part on implementing a clause of the continuous query on the stream associated with the business event data of the user. In some aspects, the method may also include not instantiating an operator of the continuous query when it relies on a dimension table until a time after receiving an indication that data in the dimension table has changed. The method may also include loading less than all of the set of first results in memory and/or loading only a subset of the first results in memory when the subset is associated with a low probability of changing. Further, the stream associated with the business event data of the user may include one or more archived relations.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the FIG. in which the reference number first appears. The use of the same reference numbers in different FIGS. indicates similar or identical items.

DETAILED DESCRIPTION

Figure 1:
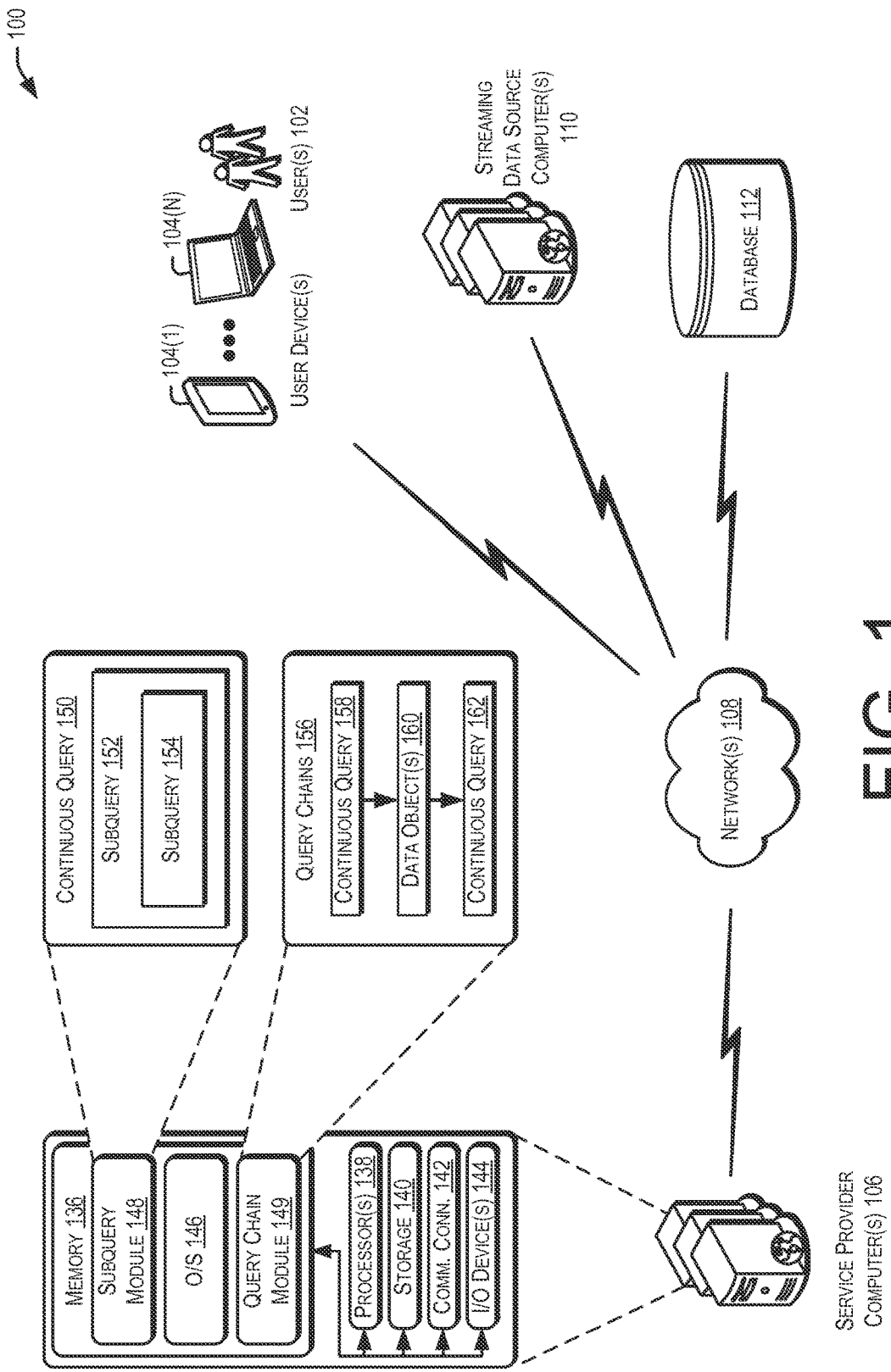
FIG. 1 is a simplified block diagram illustrating an example architecture for managing subquery and/or chaining techniques associated with continuous queries, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In some examples, mechanisms to support continuous query language (CQL) queries (also referred to as "query statements") with one or more continuous subqueries, for example, including but not limited to, nested subqueries, subqueries that operate over a time interval, subqueries that query streaming or relation data, etc., may be provided For example, in some scenarios, a query may rely on a subquery that collects data from a stream, relation, or archived relation. The query may then run utilizing the results of the subquery. Additionally, in some examples, mechanisms to support chaining (also referred to as "daisy chaining") of queries and/or data objects (DOs) may be provided. For example, a continuous query may collect data from a stream or relation and store that data in a data object. The data object may be updatable, analyzed, and/or displayed. Additional audits may be performed on the data object. Additionally, in some examples, additional continuous queries may rely on the DO.

A continuous data stream (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<time stamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

```
...
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
...
```

In the above stream, for stream element (<timestamp N+1>, <ORCL,62>), the event is <ORCL,62> with attributes "stock_symbol" and "stock_value." The timestamp associated with the stream element is "timestamp N+1". A continuous event stream is thus a flow of events, each event having the same series of attributes.

As noted, a stream may be the principle source of data that CQL queries may act on. A stream S may be a bag (also referred to as a "multi-set") of elements (s, T), where "s" is in the schema of S and "T" is in the time domain. Additionally, stream elements may be tuple-timestamp pairs, which can be represented as a sequence of timestamped tuple insertions. In other words, a stream may be a sequence of timestamped tuples. In some cases, there may be more than one tuple with the same timestamp. And, the tuples of an input stream may be requested to arrive at the system in order of increasing timestamps. Alternatively, a relation (also referred to as a "time varying relation," and not to be confused with "relational data," which may include data from a relational database) may be a mapping from the time domain to an unbounded bag of tuples of the schema R. In some examples, a relation may be an unordered, time-varying bag of tuples (i.e., an instantaneous relation). In some cases, at each instance of time, a relation may be a bounded set. It can also be represented as a sequence of timestamped tuples that may include insertions, deletes, and/or updates to capture the changing state of the relation. Similar to streams, a relation may have a fixed schema to which each tuple of the relation may conform. Further, as used herein, a continuous query may generally be capable of processing data of (i.e., queried against) a stream and/or a relation. Additionally, the relation may reference data of the stream.

In some examples, business intelligence (BI) may help drive and optimize business operations at particular intervals (e.g., on a daily basis in some cases). This type of BI is usually called operational business intelligence, real-time business intelligence, or operational intelligence (OI). Operational Intelligence, in some examples, blurs the line between BI and business activity monitoring (BAM). For example, BI may be focused on periodic queries of historic data. As such, it may have a backward-looking focus. However, BI may also be placed into operational applications, and it may therefor expand from a mere strategic analytical tool into the front lines in business operations. As such, BI systems may also be configured to analyze event streams and compute aggregates in real time.

In some examples, a continuous query language service (CQ Service) may be configured to extend a BI analytics server to handle continuous queries and enable real-time alerts. The CQ Service, in some aspects, may provide integration with a BI analytics server and a CQL engine. By way of example only, a BI analytics server may delegate continuous queries to the CQService and the CQService may also act as a logical database (DB) gateway for a CQL engine. In this way, the CQL engine may be able to leverage the BI analytics server for its analytics capabilities and semantic modeling. In some examples, the CQL engine may be wrapped inside the CQ Service.

In some examples, the CQService may provide, among other things, the following functionalities:
Remoting service for BI Analytics Server as CQL engine Gateway;
Event source/sink adapter;
Generate data definition languages (DDLs) from logical SQL plus CQL extensions;
Provide unified model for all types of continuous queries and implementation selections;
Maintain metadata and support restartability; and
High availability and scalability support.

Additionally, in some examples, OI is a form of real-time dynamic, business analytics that can deliver visibility and insight into business operations. OI is often linked to or compared with BI or real-time BI, in the sense that both help make sense out of large amounts of information. But there are some basic differences: OI may be primarily activity-centric, whereas BI may be primarily data-centric. Additionally, OI may be more appropriate for detecting and responding to a developing situation (e.g., trend and pattern), unlike BI which may traditionally be used as an after-the-fact and report-based approach to identifying patterns.

In some examples, a business event analysis and monitoring (BEAM) system may include a CQL engine to process and/or receive in-flight data. For example, a CQL engine may be an in-memory database engine configured to query or otherwise process incoming real-time information (e.g., BI or OI). The CQL engine may utilize or understand temporal semantics and be configured to allow definition of a window of data to process. Utilizing a CQL engine may, in some cases, involve always running a query on incoming data.

In some aspects, the CQL engine may include a full blown query language. As such, a user may specify computations in terms of a query. Additionally, the CQL engine may be designed for optimizing memory, utilizing query language features, operator sharing, rich pattern matching, rich language constructs, etc. Additionally, in some examples, the CQL engine may process both historical data and streaming data. For example, a user can set a query to send an alert when California sales hit above a certain target. Thus, in some examples, the alert may be based at least in part on historical sales data as well as incoming live (i.e., real-time) sales data.

In some examples, the CQL engine or other features of the below described concepts may be configured to combine a historical context (i.e., warehouse data) with incoming data in a real-time fashion. Thus, in some cases, the present disclosure may describe the boundary of database stored information and in-flight information. Both the database stored information and the inflight information may include BI data. As such, the database may, in some examples, be a BI server or it may be any type of database. Further, in some examples, the features of the present disclosure may enable the implementation of the above features without users knowing how to program or otherwise write code. In other words, the features may be provided in a feature-rich user interface (UI) or other manner that allows non-developers to implement the combination of historical data with real-time data.

Additionally, in some examples, the present disclosure may describe dashboard customization and/or personalization. A CEP engine may be configured to include advanced, continuous analysis of real-time information and historical data. Business process models (BPMs) may include performing model-driven execution of policies and processes defined as BPM notation (BPMN) models. Key result indicators (KRI) may be utilized to tell a user how they have done in a perspective or critical success factor (CSF). For example, it may provide results for many actions, it may cover a longer period of time than key performance indicators (KPIs), and/or it may be reviewed on monthly or quarterly periods. Result indicators (RIs) may be utilized to tell a user what they have done. For example, it may summarize activity, and financial performance measure and/or it may update daily, weekly, or monthly. Further, in some aspects, performance indicators (PIs) may be utilized to inform a user what actions to take or at least make recommendations. Additionally, it may include non-financial information and may, in some cases, complement the KPI.

In some aspects, PI may be reviewed 24/7, daily, weekly, or less regularly. In some cases, KPI may include a set of measures that are most critical for the current and future success of an organization. Some KPIs may be updated daily or even 24/7 while the rest of the information may be reported weekly. Examples of KPI notifications may include, but are not limited to, whether a plane or other service vehicle was delayed or whether a trailer has been sent out underweight the previous day for a distribution company (e.g., to discover better utilization of the trucks).

In some examples, embodiments for managing real-time business events may include integrating (e.g., seamlessly) business activity monitoring, complex event processing, and business intelligence to provide a complex, and real-time set of operational information. Additionally, continuous monitoring of business events may be utilized to gain real-time visibility of business processes and/or workflows. In some examples, OI may be supplemented with traditional business intelligence. As such, operational intelligence may give more insight into business operations versus BI, which, as noted above, is more data centric. For example, OI may get inside to determine how a business is doing in a real-time fashion. Whereas BI may be more akin to data warehousing (e.g., indicating information after the fact).

Examples of KPI may include real-time call processing time. For example, a user may set real time KPI to be 15 minutes, versus weeks or days. As such, users may be enabled to take actions right away. Further, by coupling historical (data centric) information from BI warehouses with current real-time data, users may be able to view how a business is running in the current state (including continuously updated, streaming data). In some examples, advanced continuous analysis of real-time information may be included in the data processing. Additionally, incremental computations may be performed and included in displays, visualizations, user interfaces (UIs), etc.

In some examples, subqueries may be supported. Additionally, the CQL and/or CQL engine may support nested and/or other types of query aggregation and may provide incremental computation. Further, in some examples a slow changing dimension table may be utilized; yet, the CQL engine may still perform efficient processing. In one example, while joining a FACT table with a slow changing dimension table, one or more join operators may not be instantiated. In this way, memory utilization may be greatly reduced.

In some aspects, incremental computation may include not bringing all of a relational source (i.e., warehouse data) and/or streaming data into memory for a particular query. For example, for certain dimensions (e.g., a data source associated with a software product) utilized or referenced by the query, the data may not change very often (e.g., once a month or so). As such, there may be no need to load the entire source into memory for every query. So, in some cases, the data may be imported as a dimension table. Then, whenever a change happens to the dimension table, an exception may be thrown at runtime. In some cases, the exception may be received by the CQService and processed. Based at least in part on an indication that the exception is known and understood, the CQService may then reissue the query. In other words, the exception may be formatted as a special exception that indicates to the CQService that the query should be reissued in order to take the change in the dimension into account. Otherwise, other dependent factors, streams, data, or query tree branches may not be accurate or synchronous with the data of the dimension table. In some examples, the subquery may be a continuous subquery configured to be queried against a stream or a relation.

In some examples, based at least in part on a query tree, a parent operator (e.g., join or some other operator that may depend on data from multiple other operators or branches of the tree) may be responsible for starting the generation and/or execution of the query. That is, the stateful operator may initialize the state by loading appropriate relational data, streaming data, or relation data. Additionally, the parent operator may delegate to one of the child operators but not to the other (based at least in part on which operators include dimension tables). Further, once it is known that one of the operators includes a dimension (e.g., based at least in part on metadata associated with the relational source that indicates that it is a dimension), the parent operator may be configured to listen for changes to the dimension table. As indicated, when changes in the dimension table are found, an exception or other indication may be provided to inform the CQService to restart the query. Alternatively, the parent operator may be directly informed of the dimension table change; thus, signaling that it should reissue and/or re-initialize the query.

Additionally, in some examples, query and/or DO chaining may be provided. A Write Back DO may be a specialized Data Object and it can be configured with persistence. It may be used to store output events of a CQL query so it can be analyzed/audited or it can be used in a daisy chain manner for another CQL to sit on top. In some examples, a first query may run against a DO and insert the output events into the Write Back DO; then, a user can examine the Write Back DO for audit purposes, map it to a visualization, or author another query against the write back DO.

In some aspects, a write back DO may be used for chaining queries or binding to visualizations. A write back DO may be either a (archived) stream/archived relation DO. Additionally, in some examples, a complex query with subqueries in it can be broken up into two separate queries. A daisy chain query can be achieved by:

(Q1→ WB DO1→Q2→WB DO2)

In this example, query 1 collects data based at least in part on moving window (e.g., moving average execution time for the last 60 minutes, 30 minutes, or the like) on a time interval basis (e.g., every 10 minutes, 20 minutes, or the like).

The output of the query may go into DO1, and a change data control (CDC) may kick in and send the delta into CQL Engine for Q2 to consume (e.g., pattern detection).

If Q2 is a running pattern match query (i.e., the trends continue to go up by 10% each time for at least some number of time in a row), it may output an alert to the operator.

With this approach, Q1 does not need to keep events in memory; instead, it may be configured as a tactical query which may run every few minutes (e.g., 10 or more).

In some examples, a continuous query may be registered once and it may run for a long period of time (at least until instructed to end). This continuous query may receive incoming events and perform computations in memory (e.g., pattern match, aggregation function deltas, moving average computation, etc.). It may also have the notion of range (moving window) and slide (output throttles). For example:

```
SELECT customerLocation Id,
    customerStatus,
    MAX(callProcessingtime) AS MAXcallProcessingTime
    FROM CALLCENTER_TEST1.-
CALLCENTER_FACT[RANGE 60 minute ON callClosedTime
SLIDE 10 minute]
```

As the range increases, the memory footprint may become large as it has to keep all these events in memory. The events may expire when they exceed the range size. As the number of queries increases, the memory footprint may become even bigger. For at least these reasons, leveraging the write back DO and chaining queries may optimize memory usage.

The techniques described above and below may be implemented in a number of ways and in a number of contexts. Several example implementations and contexts are provided with reference to the following figures, as described below in more detail. However, the following implementations and contexts are but a few of many.

FIG. 1 depicts a simplified example system or architecture 100 in which techniques for managing subqueries and/or query chaining within a CQL may be implemented. In architecture 100, one or more users 102 (e.g., account holders) may utilize user computing devices 104(1)-(N) (collectively, "user devices 104") to access one or more service provider computers 106 via one or more networks 108. In some aspects, the service provider computers 106 may also be in communication with one or more streaming data source computers 110 and/or one or more databases 112 via the networks 108. For example, the users 102 may utilize the service provider computers 106 to access or otherwise manage data of the streaming data source computers 110 and/or the databases 112 (e.g., queries may be run against either or both of 110, 112). The databases 112 may be relational databases, SQL servers, or the like and may, in some examples, manage historical data, event data, relations, archived relations, or the like on behalf of the users 102. Additionally, the databases 112 may receive or otherwise store data provided by the streaming data source computers 110. In some examples, the users 102 may utilize the user devices 104 to interact with the service provider computers 106 by providing queries (also referred to as "query statements") or other requests for data (e.g., historical event data, streaming event data, etc.). Such queries or requests may then be executed by the service provider computers 106 to process data of the databases 112 and/or incoming data from the streaming data source computers 110. Further, in some examples, the streaming data source computers 110 and/or the databases 112 may be part of an integrated, distributed environment associated with the service provider computers 106.

In some examples, the networks 108 may include any one or a combination of multiple different types of networks, such as cable networks, the Internet, wireless networks, cellular networks, intranet systems, and/or other private and/or public networks. While the illustrated example represents the users 102 accessing the service provider computers 106 over the networks 108, the described techniques may equally apply in instances where the users 102 interact with one or more service provider computers 106 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 106 via the networks 108, or via other network connections. Further, the user devices 104 may also be configured to provide one or more queries or query statements for requesting data of the databases 112 (or other data stores) to be processed.

In some aspects, the service provider computers 106 may also be any type of computing devices such as, but not limited to, mobile, desktop, thin-client, and/or cloud computing devices, such as servers. In some examples, the service provider computers 106 may be in communication with the user devices 104 via the networks 108, or via other network connections. The service provider computers 106 may include one or more servers, perhaps arranged in a cluster, as a server farm, or as individual servers not associated with one another. These servers may be configured to perform or otherwise host features described herein including, but not limited to, the fast path evaluation of Boolean predicates described herein. Additionally, in some aspects, the service provider computers 106 may be configured as part of an integrated, distributed computing environment that includes the streaming data source computers 110 and/or the databases 112.

In one illustrative configuration, the service provider computers 106 may include at least one memory 136 and one or more processing units (or processor(s)) 138. The processor(s) 138 may be implemented as appropriate in hardware, computer-executable instructions, firmware, or combinations thereof. Computer-executable instruction or firmware implementations of the processor(s) 138 may include computer-executable or machine-executable instructions written in any suitable programming language to perform the various functions described.

The memory 136 may store program instructions that are loadable and executable on the processor(s) 138, as well as data generated during the execution of these programs. Depending on the configuration and type of service provider computers 106, the memory 136 may be volatile (such as random access memory (RAM)) and/or non-volatile (such as read-only memory (ROM), flash memory, etc.). The service provider computers 106 or servers may also include additional storage 140, which may include removable storage and/or non-removable storage. The additional storage 140 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 136 may include multiple different types of memory, such as static random access memory (SRAM), dynamic random access memory (DRAM), or ROM.

The memory 136, the additional storage 140, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 136 and the additional storage 140 are all examples of computer storage media.

The service provider computers 106 may also contain communications connection(s) 142 that allow the identity interface computers 120 to communicate with a stored database, another computing device or server, user terminals, and/or other devices on the networks 108. The service provider computers 106 may also include input/output (I/O) device(s) 144, such as a keyboard, a mouse, a pen, a voice input device, a touch input device, a display, one or more speakers, a printer, etc.

Turning to the contents of the memory 136 in more detail, the memory 136 may include an operating system 146 and one or more application programs or services for implementing the features disclosed herein including at least a subquery module 148 and/or a query chain module 149. As used herein, modules may refer to programming modules executed by servers or clusters of servers that are part of a service. In this particular context, the modules may be executed by the servers or clusters of servers that are part of the service provider computers 106. In some examples, the subquery module 148 may be configured to, receive, identify, generate or otherwise provide one or more continuous queries 150 that may contain subqueries 152, 154 (e.g., continuous and/or tactical subqueries). For example, a continuous query 150 (e.g., a query configured to be run against a stream or relation) may include one or more subqueries 152, 154 or nested subqueries 154 upon which the query sits (i.e., on which it depends). More specifically, a continuous query 150 may include a subquery 152 which may in turn include a subquery 154 (e.g., nested within the first subquery 152). Other scenarios are possible, as desired, for example, the continuous query 150 may include two or more subqueries 152 with no nested subqueries 154, or the like.

In some examples, a CQL engine in may support nesting and/or embedding of one or more queries inside another via the mechanism of views. For example, the following CQL code may be utilized to configure such a query that includes a subquery:

```
create view sales_v1 as select prodid, sales as sales from
sales_stream [RANGE 24 hours];
create query q0 as select prodid, sum(sales) from sales_v1 group by
prodid;
```

In some aspects, this approach may provide modularity and reuse. Additionally, it may also create a dependency for query q0 on the view sales_v1. So the definition of view sales_v1 may, in some cases, not be changed as long as there are dependent continuous queries on it. Even for cases where the new view definition is congruent (i.e. say project list does not change in number of items, data types, and position of items), it may request replacing of each of the queries dynamically. Alternatively, or in addition, for set queries, non-standard notation may be utilized (e.g., <view> UNION <view>). This type of syntax may not be ANSI compliant; however, the CQServiceand/or CQ Engine may be configured to process it. Further, in some aspects, some queries may be generated through a sequence of workflow steps and/or destroyed on the fly. In such cases, the view mechanism may not actually be feasible, as it requests that the clients know the dependencies.

Support for nested subqueries (also known as inline queries or sub-select) may be implemented by specifying the subquery in the FROM clauses of a query where sources relations/streams are specified. Subquery support will also be extended to set operation queries. The following sets of CQL code illustrate at least three non-limiting examples:

Example 1

This example shows a select-from-where (SFW) query embedded inside another SFW query:

```
CREATE QUERY q0 AS
SELECT prodid, sum(sales)
FROM (SELECT prodid AS prodid, sales AS sales FROM
sales_stream [RANGE 24 HOURS]) AS foo
GROUP BY prodid;
```

Example 2

This example shows a subquery with a set of operations. With subquery feature, queries that define views can be specified inline as operands to the set operations as follows (as opposed to as <view$_1$> UNION ALL <view$_2$>):

```
(SELECT c1, c2, c3 FROM S0 [RANGE 5 HOURS])
UNION ALL
(SELECT c1, c2, c3 FROM S1[RANGE 5 HOURS])
```

Example 3

This query shows how an SFW query, set operation query, and subquery can be combined in a powerful way to compose a query:

```
CREATE QUERY q0 AS
SELECT *
FROM
(
    (SELECT c1, c2, c3 FROM S0 [RANGE 5 HOURS])
    UNION ALL
    (SELECT c1, c2, c3 FROM S1[RANGE 5 HOURS])
) AS foo
GROUP BY c1
ORDER BY c1
```

In some examples, each item in a SELECT clause (or project list) of a subquery containing expressions may be explicitly aliased. This is similar to having view definitions where a project list has expressions. Expressions as such may not have names, so it may be useful to name or alias them explicitly using <expr> AS <name>. Additionally, it may not be necessary to alias a project list in SELECT*FROM <source> or SELECT <sourcealias>.* FROM <source> AS sourcealias or SELECT c1, c2, c3 FROM <source> where ci refers to an attribute of the source (which can be a base stream, relation, or another subquery). This may either be derived implicitly (in case of * notation) or may be trivially obvious when each expression refers only to base attributes. For an SFW query (query contain select-from-where), the subquery itself may also be aliased. However, in some examples, it may be an error not to specify an explicit alias. For set operations, in some cases, the subquery may also not be aliased. However project items with expressions may be requested to be aliased. Names of the select items of the left query may serve as the name of the overall set operation. In some examples, subqueries may only be supported in FROM clauses of a query. However, in other examples, the subqueries may be supported in any clause of the query. Further, in some cases, there is no theoretical limit on the depth of nesting. However the amount of nesting may be affected by the amount available memory of the host computing system.

Further, in some examples, an SFW query may be a very comprehensive construct with many possible clauses and combinations thereof. Each of these clauses can refer to the "attributes" of a subquery much the same way they do for a relation and stream (e.g., in the from clause). Clauses that may support subqueries include, but are not limited to, GROUP BY, ORDER BY, MATCH_RECOGNIZE, JOIN, SELECT, WHERE, ARCHIVED RELATION, and/or VALUE WINDOW.

Additionally, in some examples, the query conversion module 149 may be configured to enable query chains and/or query aggregations. For example, a query chain 156 may include a first query (e.g., a continuous query) 158, a data object (e.g., a Write Back DO) 160, and/or a second query (e.g., another continuous query) 162). As noted above, in some aspects, the first query 158 may be queried against a stream, relation, or database, and may also store the results in the data object 160. Subsequent queries (e.g., the second query 162) may then be queried against the DO 160 to obtain a second result.

As noted above, in some examples, a Write Back Data Object may be a specialized DO and it can be configured with persistence. It may be utilized to store output events of a CQL query (e.g., the first query 158) so it can be analyzed and/or audited, or it can be utilized in a daisy chain manner for another CQL query (e.g., the second query 162) to sit on top. The first query 158 may run against an initial DO (e.g., a stream, a relation, a database, another data construct, etc.) and may insert the output events into the Write Back DO 160; then a user can examine the Write Back DO 160 for audit purposes, map it to a visualization, or choose to author another query 162 against the write back DO 160.

In at least one non-limiting example, there may be a Performance DO. Additionally, a query may be written against the Performance DO to compute the moving average processing time for a particular type of process at a certain interval and output the results into another Write Back DO "Avg Processing Time." Now a bar chart can be constructed against this DO to show the historical value. Alternatively, or in addition, another pattern match query can be written against this Write Back DO to perform trend analysis. For trend analysis queries, the first and foremost requirement may be that the data source be a stream data source which may be insert only, to which the Write Back DO belongs. Thus, in some cases, the Write Back DO may always be a stream DO (i.e. only insert, no delete, upsert, or update) and can be configured with either persistence or no persistence. When persistence is not configured, no flex table is created and the "insert" event may be processed by Persistence in memory and pass through to CQ Service.

A user 102 with a data architect role may be able to create a Write Back DO. The Write Back DO may be surfaced in a Continuous Query template or the like. The user 102 may also be allowed to choose a Write Back Data Object as an optional step. The user 102 may also be able to map the select list to the Write Back DO and/or modify the Write Back DO just like with most other DO. After a Write Back DO is defined, when the CQL query fires, the output event may be sent to Persistence via a java messaging service (JMS) tool or the like. In some cases it may leverage the JMS adapter application programming interface (API) to send out the insert event to a Persistence tool of the service provider computers 106.

In some examples, a significant performance savings can be gained by converting a complex CQL query into two separate queries with a Write Back DO in between. For example, note that in the following subquery portion, the query is running a continuous query (e.g., with an archived relation) which computes the max call processing time for the calls which were closed in the last (moving) 60 minutes and output the result every 10 minutes. In this query, all events in the last 60 minutes are stored in memory and they expired individually as time moves on. So if you have 20,000 events come in every 60 minutes, CQL Engine will store 20,000 events in memory at any given time and the max processing time is being re-computed every time an event enters the system. Finally, at every 10 minutes interval, the max processing time is being outputted as an insert stream. Additionally, in the second part of the query, note that the query is taking in the output from the subquery and it performs a pattern match where it's detecting an upward trending (the current measure is 7% more than last measure and this pattern has been detected for 7 times in a row).

```
CREATE QUERY CALLCENTER_TEST1.trendingQuery1 as
SELECT T.customerLocationId ,
    T.customerStatus ,
    T.MAXcallProcessingTime
FROM (
ISTREAM(
  SELECT customerLocationId ,
      customerStatus ,
      MAX(callProcessingTime) AS MAXcallProcessingTime
  FROM CALLCENTER_TEST1.CALLCENTER_FACT[RANGE
60 minute ON callClosedTime SLIDE 10 minute]
    WHERE customerLocationId = 'CN'
GROUP BY customerLocationId
)
) AS q
MATCH_RECOGNIZE (
 MEASURES
    A.customerLocationId AS customerLocationId,
    A.customerStatus AS customerStatus,C.MAXcallProcessingTime AS
MAXcallProcessingTime
 ALL MATCHES
 PATTERN (A B+ C)
 DEFINE
    B AS B.MAXcallProcessingTime>0.07*prev(B.-
MAXcallProcessingTime) and count(*) < 7,
    C AS C.MAXcallProcessingTime>0.07*last(B.-
MAXcallProcessingTime) and count(*) = 7
) AS T destination "jms:topic/oracle.beam.cqs.activedata"
```

Note that there's a lot of memory being consumed by the first query. Instead with the Write Back DO and the CQL Scheduled Query, the following can be achieved (e.g., since the first query only outputs every 10 minutes, one can re-write the query):

```
CREATE QUERY CALLCENTER_TEST1.trendingQuery1 as
SELECT customerLocationId ,
    customerStatus ,
    MAX(callProcessingTime) AS MAXcallProcessingTime
  FROM CALLCENTER_TEST1.CALLCENTER_FACT WHERE
customerLocationId = 'CN' and
TIMESTAMPDIFF(SQL_TSI_MINUTE, callClosedTime,
CURRENT_TIMESTAMP) < 60
GROUP BY customerLocationId
REFRESH ON "0:0:0" AT EVERY 10 MINUTES
)
```

In this case, the CQL will run this query every 10 minutes and no memory is taken up while running this query. The output of this query then goes into a STREAM based Write Back DO. At that point, the second query (pattern match for trending) is then applied to this intermediate Write Back DO. With this approach, the only memory consumption is on the trending query which keeps track of the last 7 events from the Write Back DO. Additionally, a few examples of the operations of the subquery module 148, the query chain module 149, and/or the service provider computers 106 are described in greater detail below.

Additional types of computer storage media (which may also be non-transitory) that may be present in the service provider computers 106 and/or user devices 104 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 106 and/or user devices 104. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Figure 2:
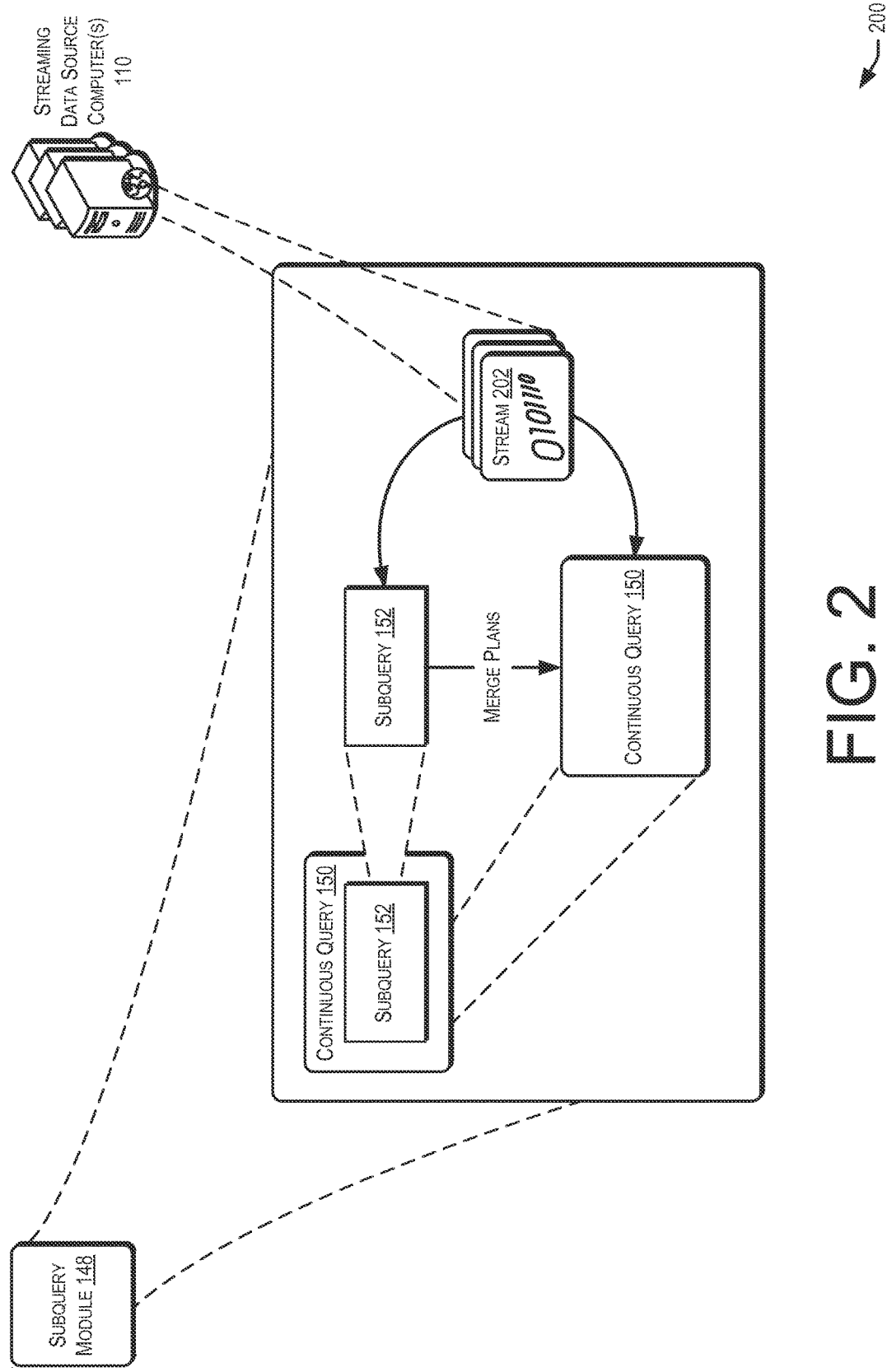
FIG. 2 is a simplified block diagram illustrating at least some features of the management of subquery and/or chaining techniques associated with continuous queries described herein, according to at least one example.

FIG. 2 illustrates a simplified block diagram 200 with which features of the management of continuous queries in the presence of subqueries may be described. As noted above, in some examples, a subquery module 148 may be executed by the service provider computers 106 of FIG. 1 and may include one or more continuous queries 150 that rely on one or more subqueries 152. In one non-limiting example, the continuous query 150 may depend on results of the subquery 152. As such, the subquery may first query against a stream 202 that may be provided or otherwise managed by the streaming data source computers 110 of FIG. 1. However, in other examples, the subquery 152 may query against a relation, a data object, or a database (e.g., a relational database or the like). Additionally, in some examples, a logical plan may be generated or otherwise built based at least in part on the subquery 152. Once the subquery has at least one result, the continuous query 150 may query against the stream 202 utilizing the results of the subquery 152. In this way, data of the stream 202 or of another stream may be accessible without having knowledge of some of the actual keys. For example, the subquery 152 may retrieve a result that can be utilized by the continuous query 150 as a key for querying against the stream 202. Further, in some aspects, the logical (or physical plan) describing the subquery 152 may be merged (e.g., at a logical layer) with a plan that is based at least in part on the continuous query 150. For example, where the continuous query 150 (i.e., the parent query in this example) expects a FROM source (e.g., a stream, relation, etc.), the logical plan for implementing the subquery 152 may be included. As such, beyond the logical layer, it may be indistinguishable whether the continuous query 150 ever included any subqueries 152. In this way, may continuous queries 150 that include the same subqueries 152 may automatically share the same plan operators.

Further, as noted above, in some examples, a slow changing dimension table may be utilized (e.g., when the subquery 152 queries against a relational source). The relational source may provide historical and/or warehoused data as opposed to streaming data. As such, some of the data obtained by the subquery 152 may not change often. Yet, when it does, the continuous query 150 may request that the subquery 152 be re-implemented in order to update or otherwise refresh the result that the continuous query 150 is relying upon.

Figure 3:
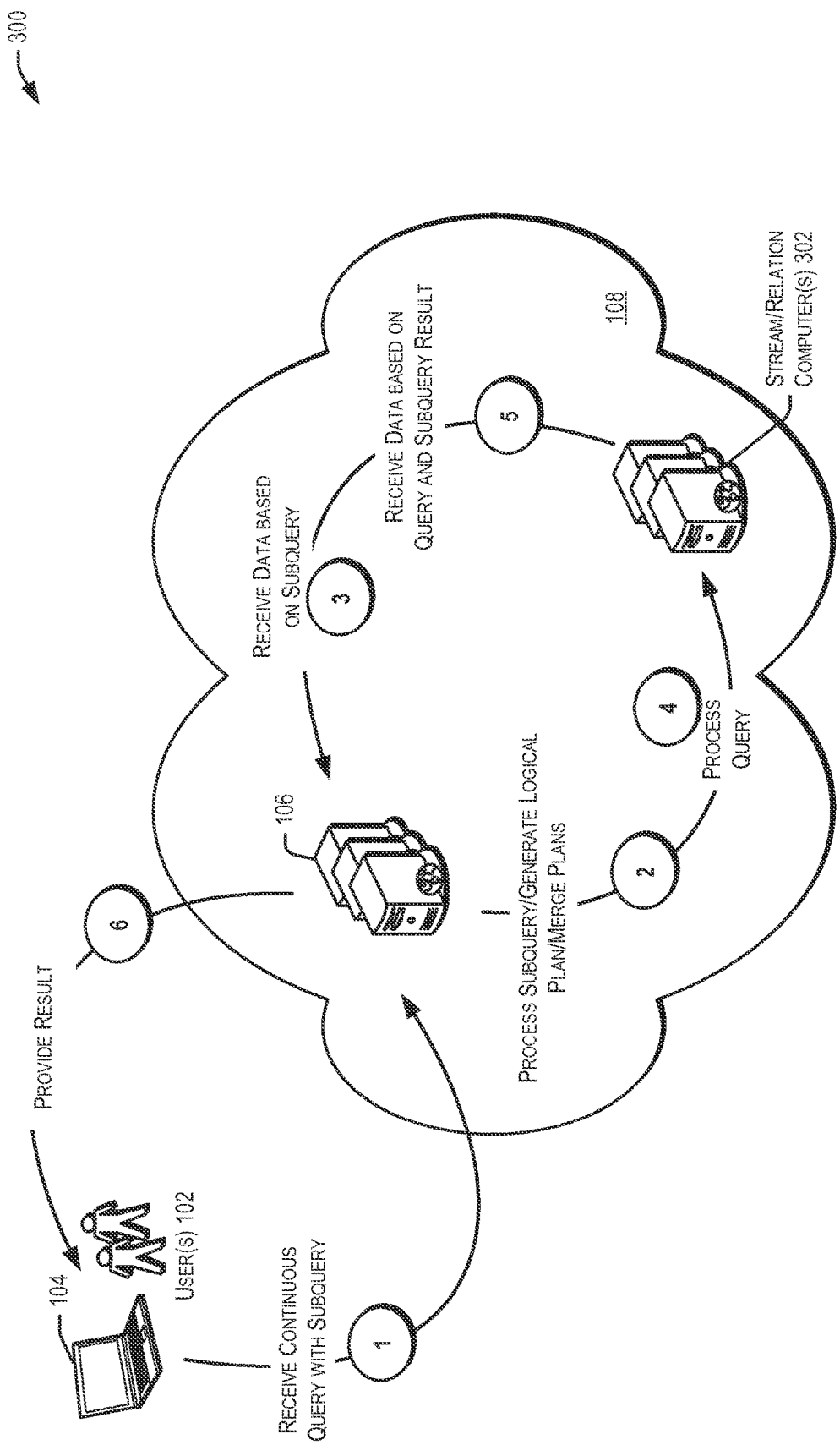
FIG. 3 is a simplified flow diagram illustrating at least some additional features of the management of subquery and/or chaining techniques associated with continuous queries described herein, according to at least one example.

FIG. 3 depicts a simplified flow diagram showing one or more techniques 300 for implementing the management of continuous queries in the presence of subqueries, according to one example. In FIG. 3, the service provider computers 106 are again shown in communication with the users 102 and/or user devices 104 via the networks 108. Additionally, in some examples, the service provider computers 106 may include or be in communication with (e.g., via the networks 108) one or more stream/relation computers 302. While techniques 300 are shown in FIG. 3 in a particular order (including arbitrary sequence numbers), it should be understood that no particular order is necessary and that one or more steps or parts of the techniques 300 may be omitted, skipped, and/or reordered. In at least one non-limiting example, the one or more service provider computers 106 described above with reference to FIGS. 1 and 2 may receive a continuous query with a subquery from the user devices 104. The continuous query may be configured to request processing (e.g., retrieval, storage, deletion, etc.) of database data (e.g., data stored in a database), streaming event data (e.g., data being received in real-time from the stream/relation computers 302), and/or relation data (e.g., relations received from the stream/relation computers 302).

Additionally, in some examples, the service provider computers 106 may also process the subquery found within the continuous query by querying it against a relation or a stream of the stream/relation computers 302. However, in other examples, processing the subquery may include generating a logical and/or physical plan for implementing the subquery. In this way, the subquery itself may not be processed against a data source until the continuous query is processed. When a logical plan is generated, the logical plan may then be merged with a plan generated to implement the continuous query. For example, as noted above, the logical plan may be included at the FROM statement of the continuous query. In response, the service provider computers 106 may receive data based at least in part on the subquery or the data associated with the subquery may be received after merger, when the continuous query is applied against the data source (e.g., relation, stream, or other source). As noted, the continuous query may then be applied against a relation or stream, but including the results received via the subquery. As such, the continuous query may be queried against the stream or relation of the stream/relation computers 302 based at least in part on the subquery results. Additionally, in some examples, the service provider computers 106 may then receive data from the stream/relation computers 302 based at least in part on the continuous query parameters and the subquery result. Further, the service provider computers 106 may then provide the result to the user devices 104. Additionally, alerts may also be provided to the user devices 104 and/or visualization information.

Figure 4:
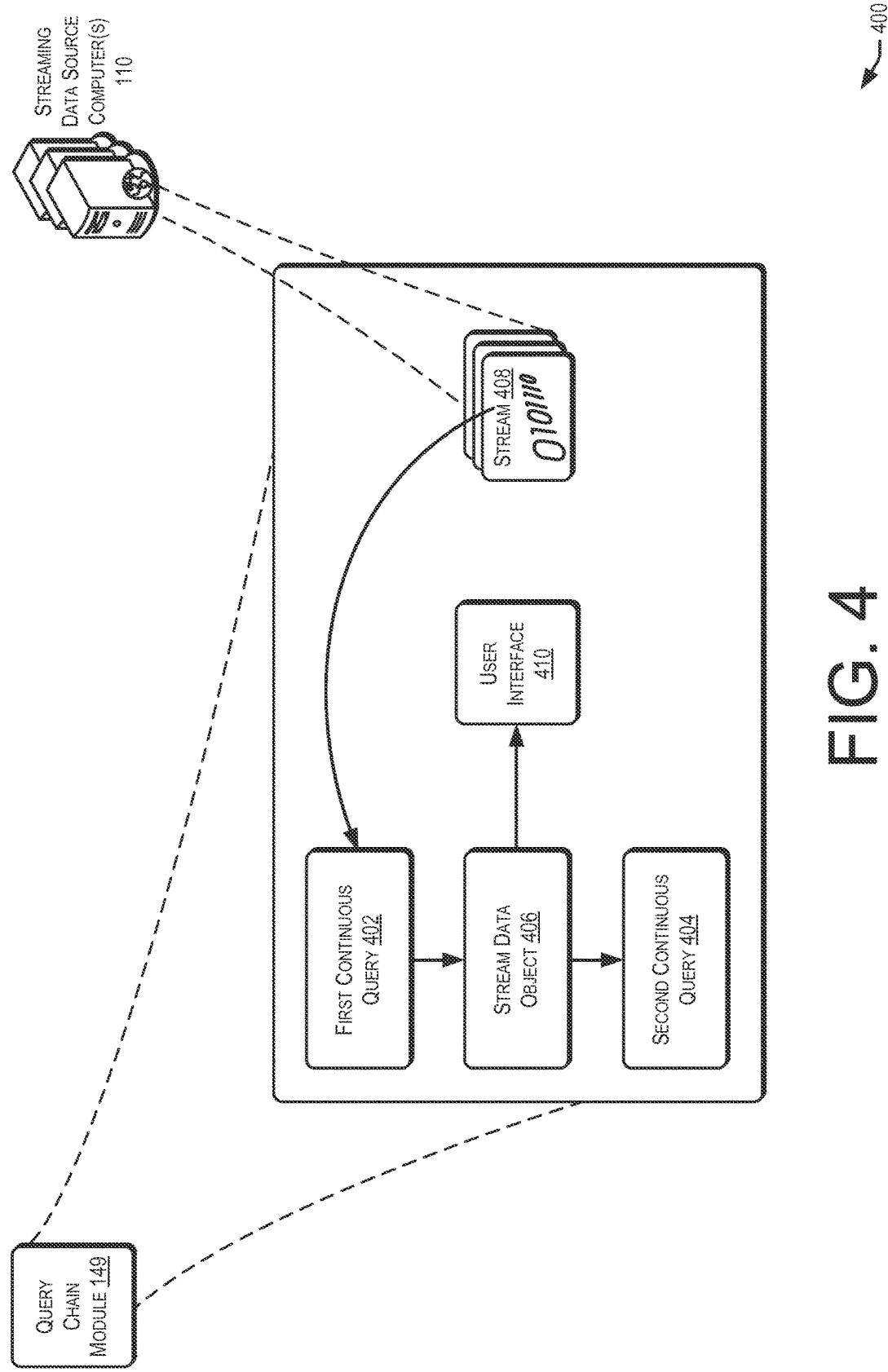
FIG. 4 is a simplified flow diagram illustrating at least some additional features of the management of subquery and/or chaining techniques associated with continuous queries described herein, according to at least one example.

FIG. 4 illustrates a simplified block diagram 400 with which features of the mechanisms for chaining continuous queries may be described. As noted above, in some examples, a query chain module 149 may be executed by the service provider computers 106 of FIG. 1 and may include one or more continuous queries 402, 404 and/or one or more data objects 406. In one non-limiting example, a second continuous query 404 may depend on or query against a data object 406. However, the DO 406 may contain results obtained via a first continuous query 402. As such, the first continuous query 402 may first query against a stream 408 that may be provided or otherwise managed by the streaming data source computers 110 of FIG. 1. However, in other examples, the first continuous query 402 may query against a relation, a data object, or a database (e.g., a relational database or the like). Once the first continuous query 402 has at least one result, that data may be stored in the DO 406. In some examples, the DO 406 may be a stream DO (e.g., only utilizing insert clauses) or it may be any type of DO.

Once the data of collected (i.e., obtained) by the first continuous query 402 is stored in the DO 406, a user or other entity may access the DO 406. For example, the data of the DO 406 may be audited, displayed, edited, or otherwise managed. As such, the data of the DO 406 may be provided to a user interface 410. Additionally, subsequent queries (e.g., the second continuous query 404) may later query against the DO 406. In this way, multiple continuous queries (or tactical queries) may be chained together, where subsequent queries rely or otherwise depend upon previous queries via DOs 406.

Figure 5:
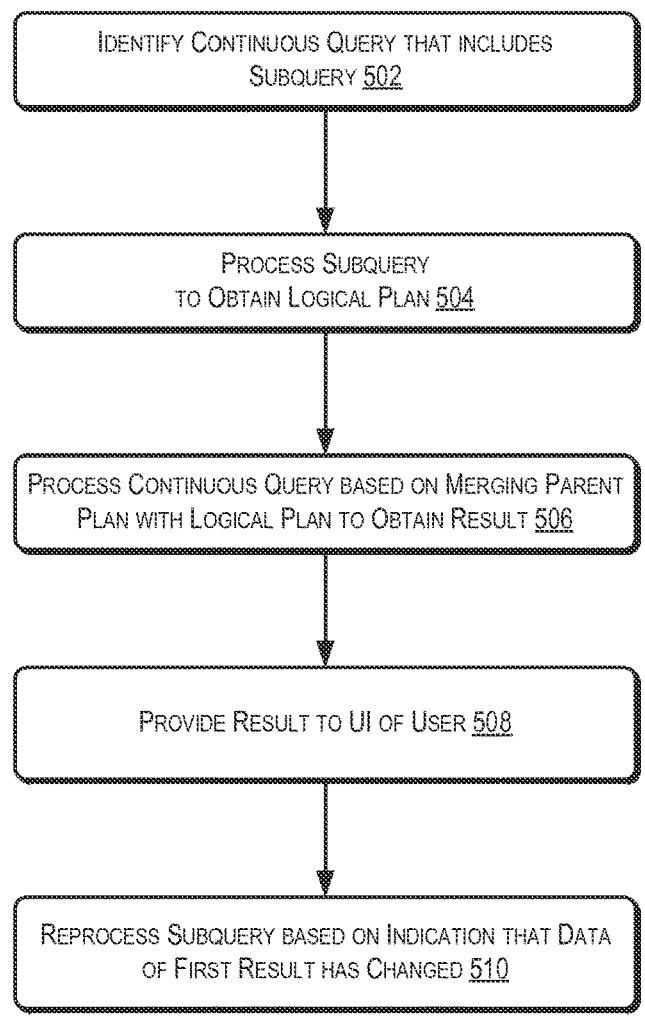
FIG. 5 is a simplified process flow illustrating at least some features of the management of subquery and/or chaining techniques associated with continuous queries described herein, according to at least one example.
Figure 6:
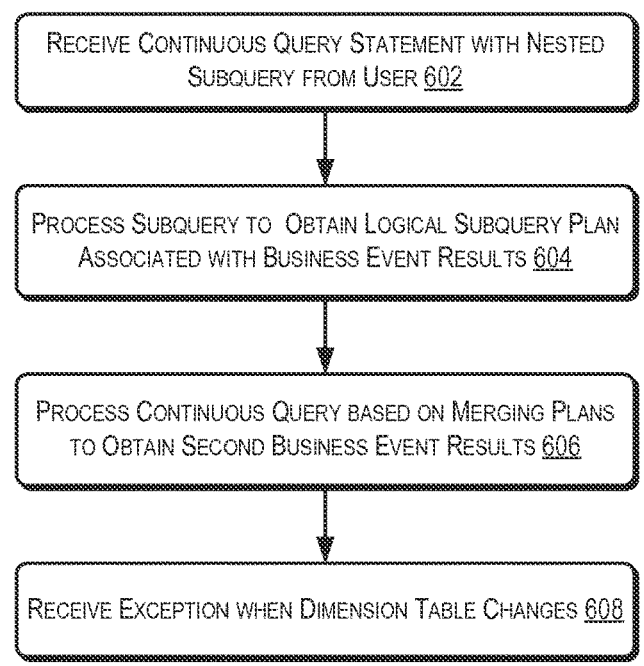
FIG. 6 is another simplified process flow illustrating at least some features of the management of subquery and/or chaining techniques associated with continuous queries described herein, according to at least one example.
Figure 7:
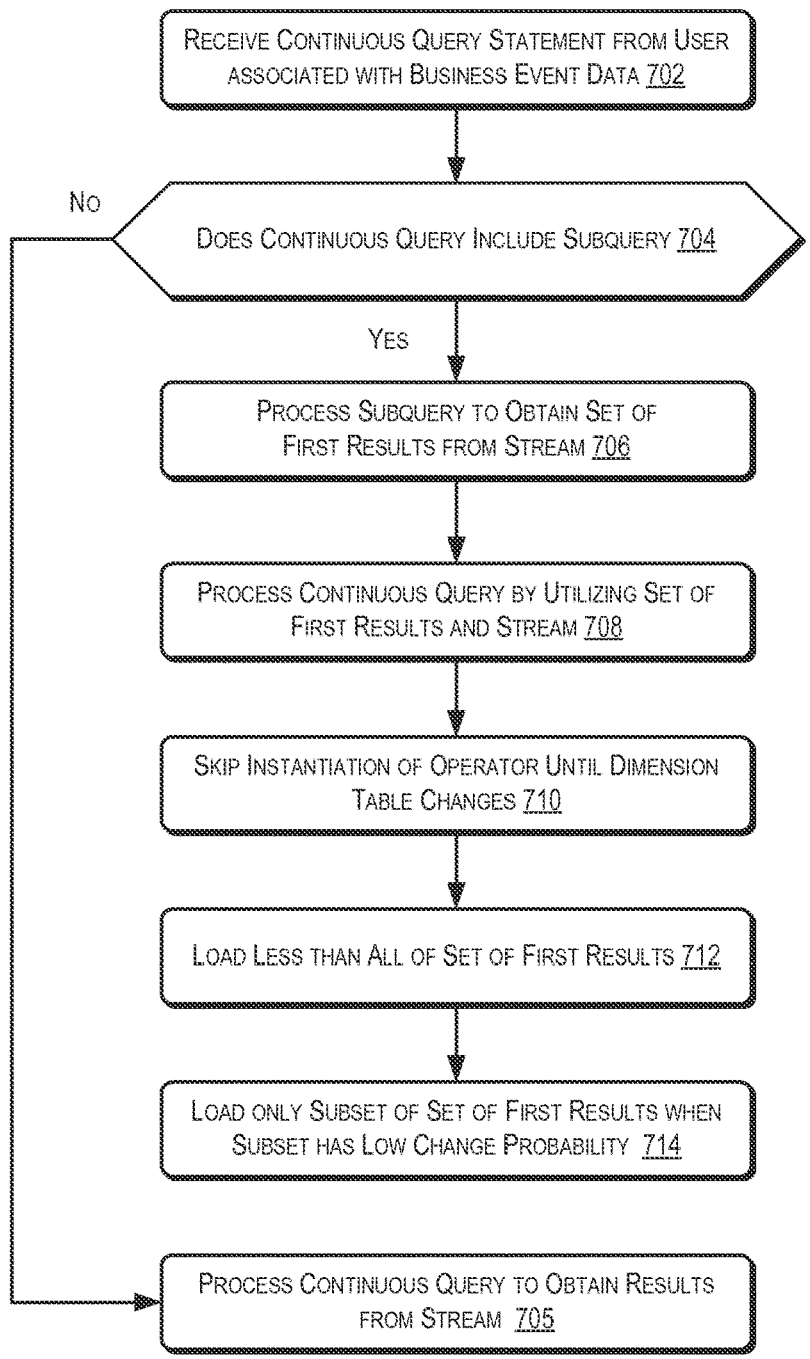
FIG. 7 is another simplified process flow illustrating at least some features of the management of subquery and/or chaining techniques associated with continuous queries described herein, according to at least one example.

FIGS. 5-7 illustrate example flow diagrams showing respective processes 500, 600, and 700 for implementing the management of continuous queries in the presence of subqueries described herein. These processes 500, 600, 700 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 106 (e.g., utilizing at least the subquery module 148 of FIG. 1) shown in FIGS. 1-3 may perform the process 500 of FIG. 5. The process 500 may begin by including identifying a continuous query that includes at least one subquery (e.g., a continuous subquery or a tactical subquery) at 502. In some examples, the process 500 may also include, at 504, processing the subquery to obtain a logical plan for implementing the subquery (e.g., the logical plan may include steps for querying against a data source with the subquery). At 506, the process 500 may also include processing the continuous query (e.g., the query that includes the subquery) based at least in part on merging the logical plan with a continuous query logical plan. For example, at the FROM statement of the continuous query (or a logical plan for implementing the continuous query) the logical subquery plan may be included. In some aspects, this may include querying against a data source (e.g., the same data source that the subquery queried against or another data source) utilizing the first result from the subquery. At 508, the process 500 may include providing the second result to a user interface of the user. Further, the process 500 may end at 510 by including reprocessing the subquery based at least in part on an indication that data of the subquery has changed.

FIG. 6 illustrates an example flow diagram showing process 600 for implementing the management of continuous queries in the presence of subqueries described herein. The one or more service provider computers 106 (e.g., utilizing at least the subquery module 148 of FIG. 1) shown in FIGS. 1-3 may perform the process 600 of FIG. 6. The process 600 may begin at 602 by including receiving a continuous query statement that includes one or more nested subqueries. The continuous query with nested subqueries may, in some examples, be received from a user. At 604, the process 600 may include processing the nested subqueries to obtain a logical plan for implementing the nested subqueries (e.g., at least one of the nested subqueries and/or at least the most nested subquery). As noted, processing a query and/or subquery may include querying a data source with the query or subquery, respectively. Additionally, in some examples, the process 600 may include processing the continuous query based at least in part on the logical plan merger (e.g., from the nested subquery) to obtain a business event result at 606. Further, at 608, the process 600 may end by including receiving an exception when a dimension table changes. For example, a dimension table may define attributes or columns associated with the results of the subquery. When the underlying data (that is, the data that the continuous query will depend upon) changes, the exception may notify the query engine to refresh or reprocess the subquery.

FIG. 7 illustrates an example flow diagram showing process 700 for implementing the management of continuous queries in the presence of subqueries described herein. The one or more service provider computers 106 (e.g., utilizing at least the subquery module 148 of FIG. 1) shown in FIGS. 1-3 may perform the process 700 of FIG. 7. The process 700 may begin by including receiving a continuous query statement from a user associated with business event data at 702. At 704, the process 700 may include determining whether the continuous query includes a continuous subquery. In some cases, when it is determined that the continuous query does not include a subquery, the process 700 may end at 705 by including processing the continuous query to obtain results from a stream or relation. However, in other examples, it may be determined, at 704, that the continuous query does include a subquery. In this example, the process 700 may instead include processing the subquery to obtain a set of first results from a stream or relation at 706. At 708, the process 700 may also include processing the continuous query by utilizing the set of first results and/or the stream or relation data. Additionally, at 710, the process 700 may include skipping instantiation of an operator until data of a dimension table changes. At 712, the process 700 may include loading less than all of the set of first results into the continuous query (e.g., for data is not expected to change often). Further, the process 700 may end at 714, where the process 700 may include loading only a subset of the set of first results when data of the subset has a low probability of changing.

Figure 8:
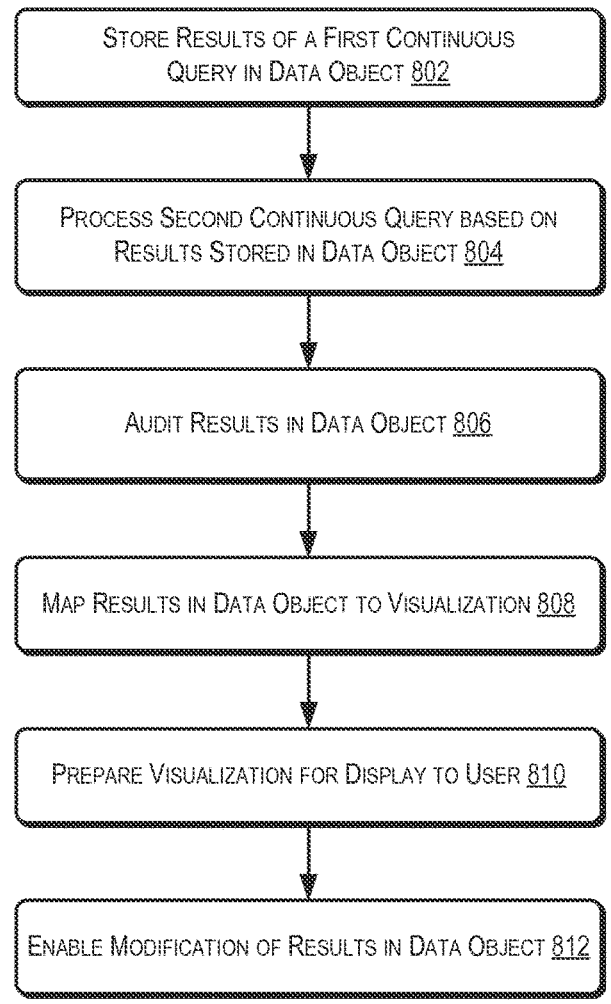
FIG. 8 is a simplified process flow illustrating at least some features of the management of subquery and/or chaining techniques associated with continuous queries described herein, according to at least one example.
Figure 9:
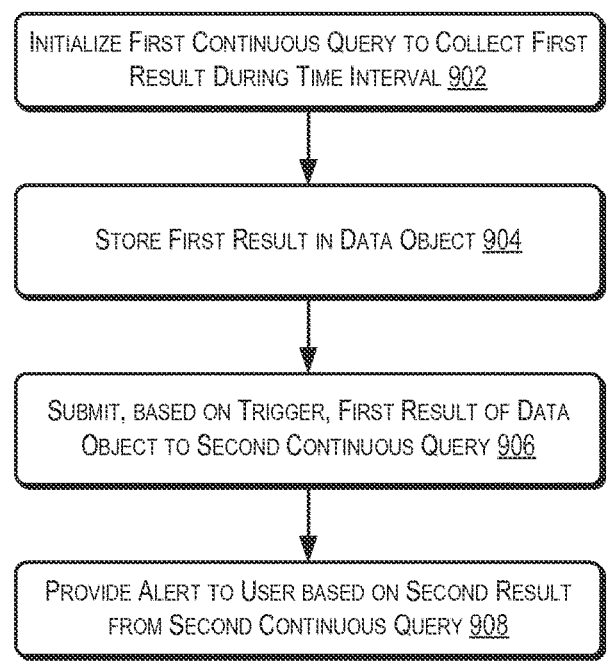
FIG. 9 is another simplified process flow illustrating at least some features of the management of subquery and/or chaining techniques associated with continuous queries described herein, according to at least one example.
Figure 10:
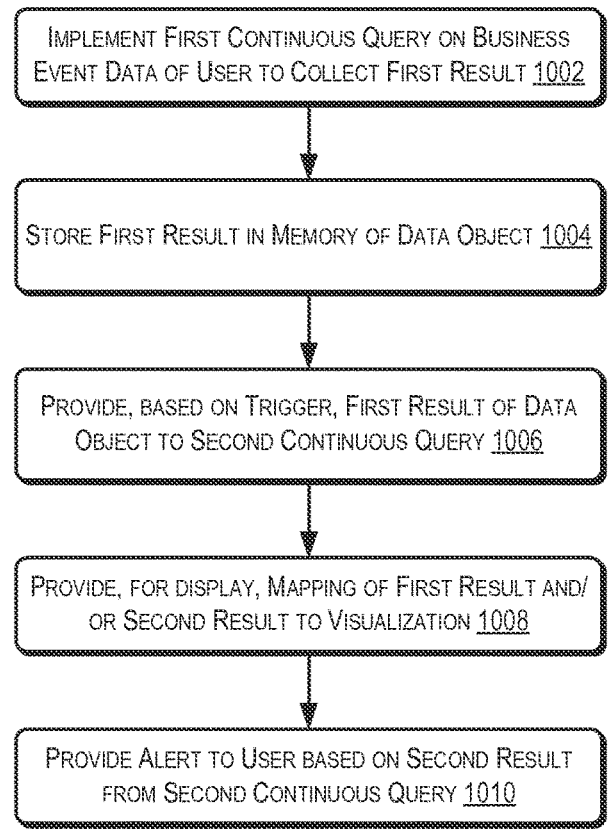
FIG. 10 is another simplified process flow illustrating at least some features of the management of subquery and/or chaining techniques associated with continuous queries described herein, according to at least one example.

FIGS. 8-10 illustrate example flow diagrams showing respective processes 800, 900, and 1000 for implementing the mechanisms for chaining continuous queries described herein. These processes 800, 900, 1000 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 106 (e.g., utilizing at least the query chain module 149 of FIG. 1) shown in at least FIG. 1 may perform the process 800 of FIG. 8. The process 800 may begin by including storing results of a first continuous query in a data object at 802. The results may be the result of querying against a stream or relation with the first continuous query. At 804, the process 800 may include processing a second continuous query based at least in part on results stored in the data object. As such, the first and second continuous queries may be chained together by the data object. Additionally, at 806, the process 800 may include auditing the results of the data object. Alerts may be provided and/or, at 808, the process 800 may include mapping the results in the data object to a data visualization. At 810, the process 800 may also include preparing the visualization for display. Further, the process 800 may end at 812 by including enabling modification of the results in the data object.

FIG. 9 illustrates an example flow diagram showing process 900 for implementing the mechanisms for chaining continuous queries described herein. The one or more service provider computers 106 (e.g., utilizing at least one of the query chain module 149 of FIG. 1) shown in at least FIG. 1 may perform the process 900 of FIG. 9. The process 900 may begin at 902 by including initializing a first continuous query to collect a first result during a time interval. At 904, the process 900 may also include storing the first result in a data object (e.g., a Write Back DO configured to daisy chain continuous queries together). At 906, the process 900 may include submitting, based at least in part on a trigger, the first result of the data object to a second continuous query. Additionally, at 908, the process 900 may end by including providing an alert to a user based at least in part on the second result from the second continuous query. Further, multiple chains may be implemented by utilizing multiple different data objects configured to store results of the previous query for use by the next query.

FIG. 10 illustrates an example flow diagram showing process 1000 for implementing the mechanisms for chaining continuous queries described herein. The one or more service provider computers 106 (e.g., utilizing at least one of the query chain module 149 of FIG. 1) shown in at least FIG. 1 may perform the process 1000 of FIG. 10. The process 1000 may begin by including implementing at least a first continuous query on business event data of a user to collect a first result at 1002. At 1004, the process 1000 may also include storing the first result in a memory associated with a data object. The process 1000 may also include providing, based at least in part on a trigger, the first result stored in the data object to at least a second continuous query at 1006. At 1008, the process 1000 may also include providing, for display, a mapping of the first result and/or the second result to a business event visualization. Further, the process 100 may end, at 1010, by including providing an alert to the user based at least in part on the second result from the continuous query (e.g., falling outside a tolerance level or approaching a threshold).

Illustrative methods and systems for implementing the hybrid execution of continuous and scheduled queries are described above. Some or all of these systems and methods may, but need not, be implemented at least partially by architectures and processes such as those shown at least in FIGS. 1-10 above.

Figure 11:
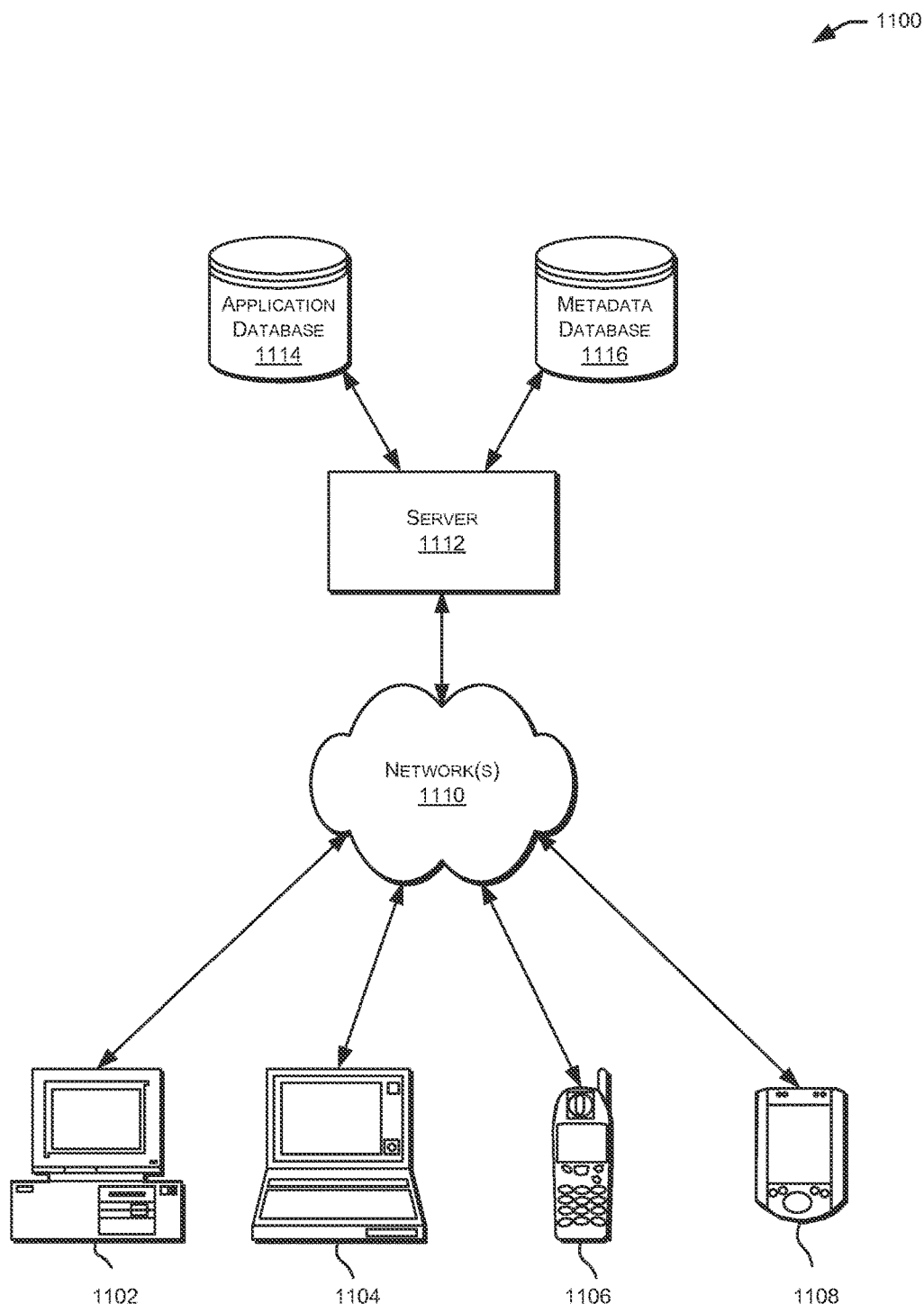
FIG. 11 is a simplified block diagram illustrating components of a system environment that may be used in accordance with an embodiment of the management of subquery and/or chaining techniques associated with continuous queries described herein, according to at least one example.

FIG. 11 is a simplified block diagram illustrating components of a system environment 1100 that may be used in accordance with an embodiment of the present disclosure. As shown, system environment 1100 includes one or more client computing devices 1102, 1104, 1106, 1108, which are configured to operate a client application such as a web browser, proprietary client (e.g., Oracle Forms), or the like over one or more networks 1110 (such as, but not limited to, networks similar to the networks 108 of FIGS. 1 and 3). In various embodiments, client computing devices 1102, 1104, 1106, and 1108 may interact with a server 1112 over the networks 1110.

Client computing devices 1102, 1104, 1106, 1108 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 1102, 1104, 1106, and 1108 may be any other electronic device, such as a thin-client computer, Internet-enabled gaming system, and/or personal messaging device, capable of communicating over a network (e.g., network 1110 described below). Although exemplary system environment 1100 is shown with four client computing devices, any number of client computing devices may be supported. Other devices such as devices with sensors, etc. may interact with server 1112.

System environment 1100 may include networks 1110. Networks 1110 may be any type of network familiar to those skilled in the art that can support data communications using any of a variety of commercially-available protocols, including without limitation TCP/IP, SNA, IPX, AppleTalk, and the like. Merely by way of example, network 1110 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 1100 also includes one or more server computers 1112 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 1112 may be adapted to run one or more services or software applications described in the foregoing disclosure. For example, server 1112 may correspond to a server for performing processing described above according to an embodiment of the present disclosure.

Server 1112 may run an operating system including any of those discussed above, as well as any commercially available server operating system. Server 1112 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 1100 may also include one or more databases 1114, 1116. Databases 1114, 1116 may reside in a variety of locations. By way of example, one or more of databases 1114, 1116 may reside on a non-transitory storage medium local to (and/or resident in) server 1112. Alternatively, databases 1114, 1116 may be remote from server 1112, and in communication with server 1112 via a network-based or dedicated connection. In one set of embodiments, databases 1114, 1116 may reside in a storage-area network (SAN) familiar to those skilled in the art. Similarly, any necessary files for performing the functions attributed to server 1112 may be stored locally on server 1112 and/or remotely, as appropriate. In one set of embodiments, databases 1114, 1116 may include relational databases, such as databases provided by Oracle, that are adapted to store, update, and retrieve data in response to SQL-formatted commands.

Figure 12:
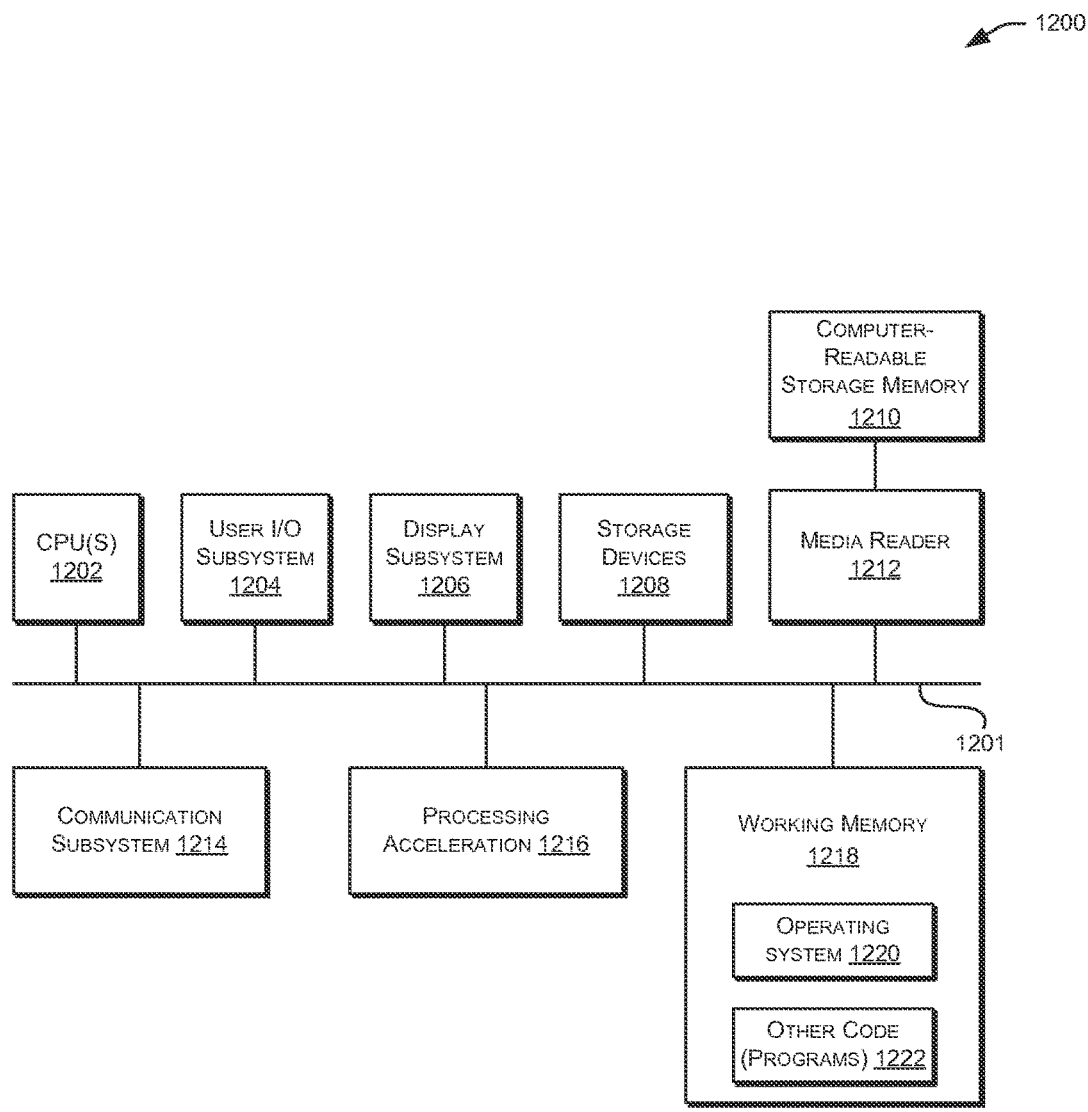
FIG. 12 is a simplified block diagram illustrating a computer system that may be used in accordance with embodiments of the management of subquery and/or chaining techniques associated with continuous queries described herein described herein, according to at least one example.

FIG. 12 is a simplified block diagram of a computer system 1200 that may be used in accordance with embodiments of the present disclosure. For example service provider computers 106 may be implemented using a system such as system 1200. Computer system 1200 is shown comprising hardware elements that may be electrically and/or communicatively coupled via a bus 1201. The hardware elements may include one or more central processing units (CPUs) 1202, one or more input devices 1204 (e.g., a mouse, a keyboard, etc.), and one or more output devices 1206 (e.g., a display device, a printer, etc.). Computer system 1200 may also include one or more storage devices 1208. By way of example, the storage device(s) 1208 may include devices such as disk drives, optical storage devices, and solid-state storage devices such as a random access memory (RAM) and/or a read-only memory (ROM), which can be programmable, flash-updateable and/or the like.

Computer system 1200 may additionally include a computer-readable storage media reader 1212, a communications subsystem 1214 (e.g., a modem, a network card (wireless or wired), an infra-red communication device, etc.), and working memory 1218, which may include RAM and ROM devices as described above. In some embodiments, computer system 1200 may also include a processing acceleration unit 1216, which can include a digital signal processor (DSP), a special-purpose processor, and/or the like.

Computer-readable storage media reader 1212 can further be connected to a computer-readable storage medium 1210, together (and, optionally, in combination with storage device(s) 1208) comprehensively representing remote, local, fixed, and/or removable storage devices plus storage media for temporarily and/or more permanently containing computer-readable information. Communications system 1214 may permit data to be exchanged with network 1212 and/or any other computer described above with respect to system environment 1200.

Computer system 1200 may also comprise software elements, shown as being currently located within working memory 1218, including an operating system 1220 and/or other code 1222, such as an application program (which may be a client application, Web browser, mid-tier application, RDBMS, etc.). In an exemplary embodiment, working memory 1218 may include executable code and associated data structures used for relying party and open authorization-related processing as described above. It should be appreciated that alternative embodiments of computer system 1200 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to, volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope. Illustrative methods and systems for providing features of the present disclosure are described above. Some or all of these systems and methods may, but need not, be implemented at least partially by architectures such as those shown in FIGS. 1-12 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A system, comprising:
a memory storing a plurality of instructions; and
one or more processors configured to access the memory, wherein the one or more processors are further configured to execute the plurality of instructions to at least:
identify a continuous query;
determine whether the continuous query includes one or more continuous subqueries; and
when it is determined that the continuous query includes a continuous subquery of the one or more continuous subqueries:
process the continuous subquery to obtain first results from a time-varying relation associated with a data stream, the time-varying relation comprising a bounded window on the data stream and a same schema for each event of the data stream;
store only a subset of the first results from the continuous subquery in a dimension table when the subset of the first results is associated with a low probability of change;
issue the continuous query based at least in part on the dimension table corresponding to the continuous subquery;
receive a runtime exception;
determine whether the runtime exception is a known runtime exception that is understood by a service based at least in part on a format of the runtime exception;
when the format of the runtime exception is the known runtime exception:
identify that a change to the dimension table has occurred;
refresh the dimension table by reprocessing the continuous subquery based at least in part on the runtime exception; and
reissue the continuous query to obtain second results after the dimension table is refreshed;
store the second results of the reissued continuous query in a data object;
implement a pattern match query on the second results stored in the data object;
perform trend analysis on the pattern match query results;
provide, for display by a user interface, a mapping of the trend analysis to a visualization;
identify a pattern corresponding to a performance indicator from the trend analysis; and
provide an alert in the user interface based at least in part on the pattern identified from the trend analysis.

2. The system of claim 1, wherein the time-varying relation comprises an unordered, time-varying set of tuples associated with the stream of business event data.

3. The system of claim 1, wherein identifying the continuous query includes at least receiving the continuous query or generating the continuous query.

4. The system of claim 1, wherein the user interface is provided to a user that provided the continuous query.

5. The system of claim 4, wherein the user interface is configured to display real-time data based at least in part on the second results.

6. The system of claim 1, wherein the continuous query is dependent on the dimension table from the continuous subquery.

7. The system of claim 1, wherein the continuous subquery is included within a "from" clause or a "set" clause of the continuous query.

8. The system of claim 1, wherein the continuous subquery is configured to obtain the results over time, and wherein less than all of the results are stored in the dimension table and accessible for processing the continuous query to obtain the second result.

9. A non-transitory computer-readable memory storing a plurality of instructions executable by one or more processors, the plurality of instructions comprising:
   instructions that cause the one or more processors to receive a continuous query statement from a user associated with business event data;
   instructions that cause the one or more processors to determine whether the continuous query statement includes one or more nested subquery statements; and
   instructions that cause the one or more processors to, when it is determined that the continuous query statement includes a nested subquery statement of the one or more nested sub query statements:
      process the nested subquery statement to obtain first results corresponding to a time-varying relation associated with the business event data, the time-varying relation comprising a bounded window on the a data stream of the business event data and a same schema for each event of the data stream of business event data;
      store only a subset of the first results from the nested subquery statement in a dimension table when the subset of the first results is associated with a low probability of change;
      issue the continuous query based at least in part on the dimension table corresponding to the nested subquery statement;
      receive a runtime exception;
      determine whether the runtime exception is a known runtime exception that is understood by a service based at least in part on a format of the runtime exception;
      when the format of the runtime extension is the known runtime exception:
         identify that a change to the dimension table has occurred;
         refresh the dimension table by reprocessing the nested subquery statement based at least in part on the runtime exception; and
         reissue the continuous query statement to obtain second results after the dimension table is refreshed;
         store the second results of the reissued continuous query in a data object;
         implement a pattern match query on the second results stored in the data object;
         perform trend analysis on the pattern match query results;
         provide, for display by a user interface, a mapping of the trend analysis to a visualization;
         identify a pattern corresponding to a performance indicator from the trend analysis; and
         provide an alert in the user interface based at least in part on the pattern identified from the trend analysis.

10. The non-transitory computer-readable memory of claim 9, wherein the nested subquery statement includes at least another subquery statement.

11. A computer-implemented method, comprising:
   receiving a continuous query statement from a user associated with business event data;
   determining whether the continuous query includes one or more continuous subqueries; and
   when the continuous query includes a continuous subquery of the one or more continuous subqueries:
      processing the continuous subquery to obtain a set of first results based at least in part on implementing a clause of the continuous subquery on a time-varying relation associated with a stream associated with the business event data of the user, the time-varying relation comprising a bounded window on the stream and a same schema for each event of the data stream;
      storing only a subset of the set of first results from the continuous subquery in a dimension table when the subset of the first results is associated with a low probability of change;
      issue the continuous query by utilizing at least a subset of the dimension table based at least in part on implementing a clause of the continuous query on the stream associated with the business event data of the user;
      receiving a runtime exception;
      determining whether the runtime exception is a known runtime exception that is understood by a service based at least in part on a format of the runtime exception;
      when the format of the runtime exception is the known runtime exception:
         identifying that a change to the dimension table has occurred;
         refreshing the dimension table by reprocessing the continuous subquery based at least in part on the runtime exception; and
         reissuing the continuous query to obtain second results after the dimension table is refreshed;
         storing the second results of the reissued continuous query in a data object;
         implement a pattern match query on the second results stored in the data object;
         perform trend analysis on the pattern match query results;
         provide, for display by a user interface, a mapping of the trend analysis to a visualization;
         identify a pattern corresponding to a performance indicator from the trend analysis; and
         provide an alert in the user interface based at least in part on the pattern identified from the trend analysis.

12. The computer-implemented method of 11, further comprising not instantiating an operator of the continuous query until a time after the data in the dimension table has changed.

13. The computer-implemented method of 11, further comprising loading less than all of the set of first results in the dimension table.

14. The computer-implemented method of claim 11, wherein the time-varying relation comprises an archived relation.

* * * * *

UNITED STATES PATENT AND TRADEMARK OFFICE
CERTIFICATE OF CORRECTION

PATENT NO. : 9,990,402 B2
APPLICATION NO. : 13/830502
DATED : June 5, 2018
INVENTOR(S) : Srinivasan et al.

Page 1 of 1

It is certified that error appears in the above-identified patent and that said Letters Patent is hereby corrected as shown below:

On the Title Page

Item [*], under Notice, Line 3, after "0 days." delete "days.".

In the Specification

Column 2, Lines 4-5, delete "the a" and insert -- the --, therefor.

Column 2, Line 14, delete "query. the" and insert -- query. The --, therefor.

Column 6, Line 30, delete "CQServiceand the CQServicemay" and insert -- CQService and the CQService may --, therefor.

Column 12, Line 31, delete "CQServiceand/or" and insert -- CQService and/or --, therefor.

Column 13, Line 49, delete "from" and insert -- From --, therefor.

In the Claims

Column 25, Line 32, Claim 9, delete "the a" and insert -- the --, therefor.

Column 26, Line 56, Claim 12, after "of" insert -- claim --.

Column 26, Line 60, Claim 13, after "of" insert -- claim --.

Signed and Sealed this
Twenty-ninth Day of January, 2019

Andrei Iancu
*Director of the United States Patent and Trademark Office*